(12) United States Patent
Kimishima

(10) Patent No.: US 8,414,663 B2
(45) Date of Patent: Apr. 9, 2013

(54) MICROPOROUS POLYOLEFIN MEMBRANE COMPRISING A POLYETHLENE RESIN HAVING A SPECIFIC VISCOELASTIC ANGULAR FREQUENCY, ITS PRODUCTION METHOD, BATTERY SEPARATOR AND BATTERY COMPRISING THE SAME

(75) Inventor: Kotaro Kimishima, Yokohama (JP)

(73) Assignee: Toray Battery Separator Film Co., Ltd., Tochigi (JP)

( * ) Notice: Subject to any disclaimer, the term of this patent is extended or adjusted under 35 U.S.C. 154(b) by 0 days.

(21) Appl. No.: 12/675,737

(22) PCT Filed: Aug. 29, 2008

(86) PCT No.: PCT/JP2008/066030
§ 371 (c)(1),
(2), (4) Date: Feb. 26, 2010

(87) PCT Pub. No.: WO2009/028737
PCT Pub. Date: Mar. 5, 2009

(65) Prior Publication Data
US 2010/0209745 A1    Aug. 19, 2010

(30) Foreign Application Priority Data

Aug. 31, 2007   (JP) .................. 2007-226898

(51) Int. Cl.
| | |
|---|---|
| H01M 2/16 | (2006.01) |
| H01M 6/02 | (2006.01) |
| B32B 27/32 | (2006.01) |
| B29C 67/20 | (2006.01) |
| L08J 5/20 | (2006.01) |

(52) U.S. Cl. .... 29/623.1; 429/254; 429/188; 428/319.9; 521/27; 264/46.4

(58) Field of Classification Search .................. 429/50, 429/254, 188; 428/319.9, 516; 264/41, 479, 264/46.4; 210/500.27, 500.36; 156/244.11; 29/623.1; 521/27
See application file for complete search history.

(56) References Cited

U.S. PATENT DOCUMENTS

| | | | | |
|---|---|---|---|---|
| 6,153,133 | A  * | 11/2000 | Kaimai et al. | 264/41 |
| 6,566,012 | B1 * | 5/2003  | Takita et al. | 429/254 |
| 6,666,969 | B1 * | 12/2003 | Funaoka et al. | 210/500.36 |
| 2006/0103055 | A1 * | 5/2006 | Hoshuyama et al. | 264/479 |
| 2007/0012617 | A1 * | 1/2007 | Suzuki et al. | 210/500.27 |

FOREIGN PATENT DOCUMENTS

| | | |
|---|---|---|
| EP | 1 873 194 A1 | 1/2008 |
| JP | 2657430 B2 | 6/1997 |
| JP | 11-021361 A | 1/1999 |
| JP | 11-021362 A | 1/1999 |
| JP | 2003-103626 A | 4/2003 |
| JP | 2004-196871 A | 7/2004 |
| WO | WO-2005/023919 A * | 3/2005 |
| WO | 2006/106786 A1 | 10/2006 |

* cited by examiner

OTHER PUBLICATIONS

International Search Report dated Dec. 9, 2008.

*Primary Examiner* — Basia Ridley
*Assistant Examiner* — Kenneth Douyette
(74) *Attorney, Agent, or Firm* — Sughrue Mion, PLLC

(57) ABSTRACT

The invention relates to a microporous membrane. The membrane can have an average thickness of 23 ?m or more, an air permeability in a range of about 20 sec/100 cm₃ to 100 sec/100 cm₃, a pin puncture strength of 2,450 mN or more, and a heat shrinkage ratio of 12% or less at 105° C. The membrane can be produced from a polyolefin solution made by combining a membrane-forming solvent and at least one polyolefin resin containing polyethylene having a viscoelastic angular frequency ??0#191 of at least about 0.01 rad/sec.

15 Claims, 1 Drawing Sheet

MICROPOROUS POLYOLEFIN MEMBRANE COMPRISING A POLYETHLENE RESIN HAVING A SPECIFIC VISCOELASTIC ANGULAR FREQUENCY, ITS PRODUCTION METHOD, BATTERY SEPARATOR AND BATTERY COMPRISING THE SAME

CROSS REFERENCE TO RELATED APPLICATIONS

This application is a National Stage of International Application No. PCT/JP2008/066030 filed Aug. 29, 2008, claiming priority based on Japanese Patent Application No. 2007-226898 filed Aug. 31, 2007, the contents of all of which are incorporated herein by reference in their entirety.

FIELD OF THE INVENTION

The invention relates to a polyolefin membrane having suitably well-balanced permeability, pin puncture strength and heat shrinkage resistance, a process for producing the microporous membrane, a battery separator formed by such a microporous polyolefin membrane, a battery comprising such a separator, and the use of such a battery.

BACKGROUND OF THE INVENTION

Microporous polyethylene membranes are mainly used as battery separators, particularly as separators for lithium batteries such as primary and secondary lithium ion batteries. Such batteries can be used to power electrical and electronic equipment such as mobile phones, notebook-type personal computers, etc. Recently, investigations have been conducted relating to the use of lithium secondary batteries as a power source for electric vehicles and hybrid cars. Batteries for hybrid electric vehicles (HEVs) such as hybrid cars need a relatively high power output which generally leads to the selection of a relatively thick battery separator compared to batteries designed for lower power output. High separator porosity is also generally beneficial. Thick separators can be beneficial for improving the safety performance of high-power batteries, by, e.g., reducing the risk of catastrophic battery failure resulting from internal short circuits. However, the use of thick separators can lead to a relatively high internal electrical resistance of the battery, resulting in difficulty in obtaining high power output. Thick separators for batteries of relatively low internal resistance can be produced by increasing the separator's porosity, but such microporous membranes are disadvantageous in that they can exhibit low pin puncture strength which can lead to manufacturing difficulties. Although separators of relatively high porosity are generally desirable for use in HEV batteries, increasing separator porosity generally reduces the separator's heat shrinkage resistance, which can result in separators that are more easily broken when wound up, leading to short-circuiting between the battery's electrodes. The separators described in the following references are representative of conventional separator technology.

JP11-21361A discloses a porous polyethylene film having conventional surface strength and air permeability. The film is made using a high-molecular-weight polyethylene resin having a viscosity-average molecular weight of 300,000 or more and less than 1,000,000, which has a thickness ranging from 5 to 50 μm, an air permeability of 100 seconds/100 cc or more and less than 250 seconds/100 cc, a porosity ranging from 40 to 60%, a pin puncture strength of 350 gf/25 μm or more, a pin puncture elongation of 2.0 mm or more, and a heat shrinkage ratio of 10% or less (105° C., width direction). This porous film is produced by extruding a melt blend of the above high-molecular-weight polyethylene resin and a plasticizer in the form of a film, stretching the resultant extrudate at a temperature ranging from 40 to 110° C. after cooling, removing the plasticizer, heat-treating the resultant membrane at a temperature of 110-125° C., and then re-stretching the membrane from 1.5 to 2.5 fold.

JP11-21362A discloses a porous polyethylene film having a relatively high surface strength and pin puncture elongation. The film is made from a high-molecular-weight polyethylene resin having a viscosity-average molecular weight of above 300,000 but less than 1,000,000, a thickness ranging from 5 to 50 μm, an air permeability of 250-1,000 seconds/100 cc, a porosity ranging from 30 to 50%, a pin puncture strength of 400 gf/25 μm or more, a pin puncture elongation of 2.0 mm or more and a heat shrinkage ratio of 5% or less (105° C., width direction). This porous film is produced by extruding a melt blend of the above high-molecular-weight polyethylene resin and a plasticizer in the form of a film, stretching the resultant extrudate at a temperature ranging from 40° C. to 110° C. after cooling, removing the plasticizer, heat-treating the resultant membrane at a temperature ranging from 110° C. to 125° C., and re-stretching it in a range from 0.9 to 1.5 fold.

Japanese Patent 2657430A discloses a microporous polyolefin membrane having improved pore diameter and pore diameter distribution. The film is made from a polyolefin containing 1% by weight or more of a component having a molecular weight of $7 \times 10^5$ or more, and having a molecular weight distribution (weight-average molecular weight/number-average molecular weight) of 10-300, a porosity ranging from 35 to 95%, an average penetrating pore diameter ranging from 0.05 to 0.2 μm, a rupture strength of 0.2 kg or more at a 15-mm width, and a pore diameter distribution (maximum pore diameter/average penetrating pore diameter) of 1.5 or less. This microporous polyolefin membrane is produced by extruding a melt blend of the above polyolefin and a solvent through a die, cooling the resultant extrudate to form a gel-like composition, stretching it at a temperature ranging from the crystal dispersion temperature of the polyolefin to the melting point+10° C., removing the remaining solvent, re-stretching the resultant membrane at a temperature of the melting point of the polyolefin−10° C. or lower, and heat-setting it at a temperature ranging from the crystal dispersion temperature to the melting point.

It would be desirable to further improve microporous polyolefin membranes, especially for use as HEV-battery separators. In particular, it would be desirable to improve the process steps used to form microporous membranes for HEV-battery service, especially respecting the kinetic melt viscoelasticity of the polyolefins selected for the membranes, the stretching temperatures of the extruded gel-like sheets (before removing the membrane-forming solvents), and the stretching and heat treatment conditions of the microporous membranes after removing the membrane-forming solvents.

Accordingly, relatively thick microporous membranes are desired having improved permeability, pin puncture strength and heat shrinkage resistance characteristics, and, particularly, improved air permeability characteristics.

DISCLOSURE OF THE INVENTION

In an embodiment, the invention relates to a microporous polyolefin membrane having suitably well-balanced permeability, pin puncture strength, and heat-shrinkage resistance, and a method for making such a membrane. The term "well-balanced" in this context means that the optimization of one of these characteristics does not result in a significant degradation in another. The microporous polyolefin membrane can be a relatively thick membrane.

In another embodiment, the invention also relates to a battery separator formed by such microporous polyolefin membrane. In yet another embodiment, the invention also relates to a battery comprising such a separator, and the use of such a battery as a source or sink of electric charge.

In an embodiment the invention relates to a microporous polyolefin membrane comprising polyethylene, and having all of the following properties:

an air permeability in a range of about 20 sec/100 cm³ to 100 sec/100 cm³, a pin puncture strength of 2,450 mN or more, and a heat shrinkage ratio of 12% or less at 105° C.

The membrane can be a relatively thick membrane, e.g., the membrane can have a thickness of at least about 23 µm.

The polyethylene can have a viscoelastic angular frequency $\omega_0$ of at least about 0.01 rad/sec, for example. The value of $\omega_0$ for the polyethylene can be determined by measuring the intersection of a curve of the polyethylene's storage elastic modulus G' and a curve of the polyethylene's loss elastic modulus G" as a function of angular frequency (also referred to as $G_{crossover}$). The measurement can be made by melt rheometry at a constant temperature in a range from about 160° C. to about 220° C., for example at a constant temperature of 180° C.

In another embodiment, the invention relates to a method for producing a microporous polyolefin membrane, comprising:

(1) combining a first solvent (also called a process solvent or membrane-forming solvent) and one or more polyethylene resins wherein at least one of the polyethylene resins has a viscoelastic angular frequency $\omega_0$ of at least about $\omega_0$ of 0.01 rad/sec, at which a storage elastic modulus G' and a loss elastic modulus G" obtained by melt rheometry are equal to each other, to form a polyolefin solution, (2) extruding the polyolefin solution to form an extrudate, cooling the extrudate to form a cooled extrudate (e.g., a gel-like sheet), (3) stretching the cooled extrudate at a temperature of 118° C. or higher to form a stretched sheet, (4) removing the process solvent from the stretched sheet to form a solvent-removed sheet, (5) either (a) further stretching the solvent-removed sheet in at least one lateral direction at a membrane temperature of about 127° C. or lower from an initial length in the stretching direction $L_1$ to a final length in the stretching direction $L_2$ such that $1.3L_1 \leq L_2 \leq 1.5L_1$, and then heat-setting the re-stretched sheet at 127° C. or lower, or (b) re-stretching the solvent-removed sheet in at least one lateral direction at a membrane temperature of about 127° C. or lower from an initial length in the stretching direction $L_1$ to a second length in the stretching direction $L_2$ such that $1.31L_1 \leq L_2 \leq 2L_1$, and then annealing under conditions such that $1.3L_1 \leq L_3 \leq 1.5L_1$, wherein $L_3$ represents the length in the stretching direction of the re-stretched sheet after annealing.

Optionally, the solvent-removed sheet is dried between steps (4) and (5).

In an embodiment, the microporous polyolefin membrane is a single-layer membrane. In another embodiment, microporous polyolefin membrane is a multi-layer membrane. For example, in one embodiment the multi-layer, microporous polyolefin membrane comprises two layers where the first layer (e.g., the upper layer) comprises a first microporous layer material, and the second layer (e.g., the bottom layer) comprises a second microporous layer material comprising the polyethylene. In an alternative embodiment, the multi-layer, microporous polyolefin membrane comprises three or more layers, wherein the outer layers (also called the "surface" or "skin" layers) comprise the first microporous layer material and at least one intermediate (or interior) layer situated comprises a second microporous layer material which comprises the polyethylene. The interior layer(s) of the multi-layer, microporous polyolefin membrane are located between the surface layers, and optionally at least one interior layer is in planar contact with at least one surface layer. In yet another alternative embodiment the multi-layer, microporous polyolefin membrane comprises three or more layers, with the surface layers comprising the second microporous layer material and at least one intermediate layer comprises the first microporous layer material. When the multi-layer, microporous polyolefin membrane has three or more layers, the multi-layer, microporous polyolefin membrane has at least one layer comprising the first microporous layer material and at least one layer comprising the second microporous layer material. As will be appreciated by those skilled in the art, multilayer microporous polyolefin membranes can be made by processes such as lamination, co-extrusion, etc., including conventional membrane production processes.

DETAILED DESCRIPTION OF THE INVENTION

Figure 1:
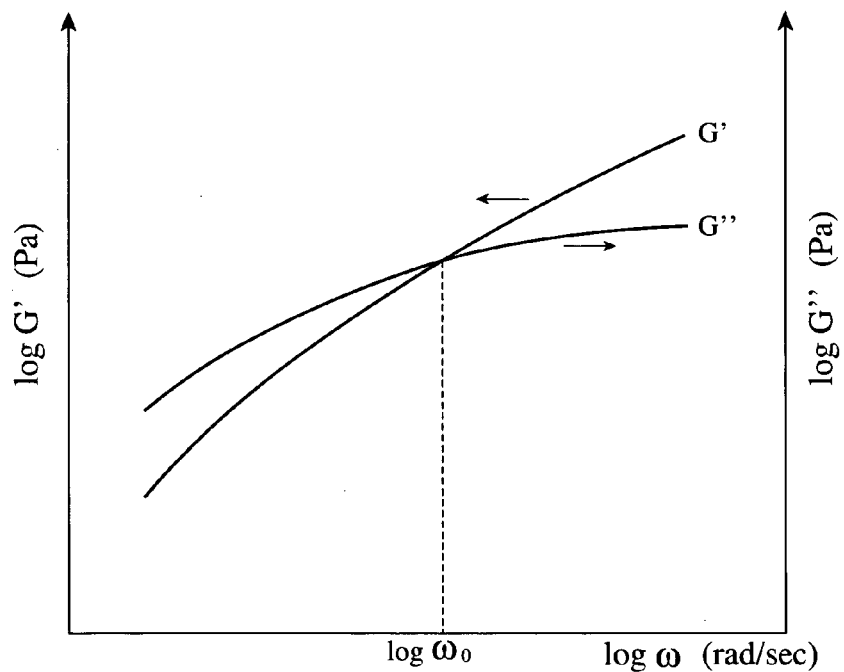
FIG. 1 is a graph showing a ω-G' curve and a ω-G" curve for determining $\omega_0$.

[1] Description of the Materials Used for Producing the Microporous Polyolefin Membrane In an embodiment, the invention relates to a microporous, polyolefin membrane made from a polyolefin solution. The polyolefin solution is produced, e.g., by combining a process solvent and one or more polyolefin resins. Prior to combining with the process solvent, portions of one or more of the resins can be combined, e.g., by melt-blending or dry-mixing, to form a polyolefin composition, but this is not required. These materials will now be described in more detail.

(A) Polyolefin Resins

In an embodiment, the polyolefin solution is produced from at least one polyolefin resin.

(1) Composition of the First Polyolefin Resin

The first polyolefin resin comprises polyethylene, generally in the form of one or more polyethylene resins. In an embodiment, the first resin (also referred to herein as the polyethylene resin) comprises at least one resin of (a) ultra-high-molecular-weight polyethylene ("UHMWPE") or (b) a second polyethylene having a lower molecular weight than the UHMWPE. In an embodiment, the first resin comprises a major amount of polyethylene. In another embodiment, the first resin consists essentially of polyethylene. In another embodiment, the first resin consists of polyethylene, i.e., it contains polyethylene only. The molecular weight of the polyethylene resin is not critical. For example, the weight-average molecular weight ("Mw") of the polyethylene resin can range from about $1 \times 10^4$ to about $1 \times 10^7$, or from about $1 \times 10^5$ to about $5 \times 10^6$, or from about $2 \times 10^5$ to about $3 \times 10^6$.

In an embodiment, the polyethylene resin comprises UHMWPE, a second polyethylene having an Mw lower than that of UHMWPE, or both. The polyethylene resin will now be described in more detail.

(a) Ultra-High-Molecular-Weight Polyethylene

In an embodiment, the UHMWPE has an Mw of about $1 \times 10^6$ or more. The UHMWPE can be an ethylene homopolymer, or an ethylene.α-olefin copolymer containing a small amount of a first α-olefin, which is not ethylene. In an embodiment, the first α-olefin (when present) comprises at least one of propylene, butene-1, pentene-1, hexene-1,4-methylpentene-1, octene-1, vinyl acetate, methyl methacrylate, or styrene. The molecular weight of the UHMWPE is not critical. For example, the Mw can ranges from about $1 \times 10^6$ to about $15 \times 10^6$, or about $1 \times 10^6$ to about $5 \times 10^6$, or about $1 \times 10^6$ to about $3 \times 10^6$.

(b) The Second Polyethylene

The second polyethylene has an Mw lower than that of UHMWPE. In an embodiment, the second polyethylene has an Mw in a range of about $1 \times 10^4$ to about $5 \times 10^5$. Accordingly, the second polyethylene can comprise at least one of high-density polyethylene, medium-density polyethylene, branched low-density polyethylene and linear low-density polyethylene. Preferably, the second polyethylene is high-density polyethylene (HDPE). When the second polyethylene is HDPE, the Mw of the HDPE can range, e.g., from about $1 \times 10^5$ to about $5 \times 10^5$, or from about $2 \times 10^5$ to about $4 \times 10^5$. The second polyethylene can be an ethylene homopolymer, or a copolymer containing small amounts of a second α-olefin such as at least one of propylene, butene-1, hexene-1, etc. In an embodiment, the second polyethylene (either the homopolymer, copolymer, or both) are produced using single-site catalysts.

(c) UHMWPE and the Second Polyethylene

In an embodiment, the polyethylene resin comprises resins of UHMWPE and the second polyethylene, e.g., in the form of a resin mixture containing both UHMWPE and the second polyethylene. For example, the polyethylene resin can comprise the UHMWPE and the HDPE.

The ultra-high-molecular-weight polyethylene and the second polyethylene can be and generally are in the form of resins which are, e.g., melt-blended before or during production of the polyolefin composition and/or polyolefin solution.

When the polyethylene resin comprises UHMWPE and the second polyethylene, the second polyethylene can have a Mw ranging, for example, from about $1 \times 10^4$ to about $5 \times 10^5$. The molecular weight distribution (weight-average molecular weight "Mw"/number-average molecular weight "Mn") of the combined ultra-high molecular weight polyethylene and the second polyethylene is not critical. For example, the molecular weight can range from from about $1 \times 10^4$ to about $1 \times 10^7$, or from about $1 \times 10^5$ to about $5 \times 10^6$, or from about $2 \times 10^5$ to about $3 \times 10^6$.

Depending of the intended use of the microporous polyolefin membrane, it can be desirable to select a molecular weight distribution in a particular range, and this can be readily accomplished by, e.g., conventional polymer synthesis and blending and synthesis methods. For example, a battery having a relatively low shut down temperature is generally less difficult to produce when the polyethylene resin has a significant fraction of relatively low molecular weight polyethylene, as would be the case when the molecular weight distribution is relatively broad. This can be accomplished by increasing the amount of the second polyethylene and reducing the amount of the UHMWPE in the polyethylene resin proportionately.

In an embodiment, the second polyethylene is HDPE. The HDPE can have an Mw ranging, for example, from about $1 \times 10^5$ to about $5 \times 10^5$.

When the polyethylene resin contains both UHMWPE and the second polyethylene, the amount of UHMWPE can range, e.g., from about 1% or more by mass based on the mass of the polyethylene in the polyethylene resin, with the balance being the second polyethylene. In another embodiment, the amount of UHMWPE ranges from about 1% to about 60% by mass, based on 100% of the mass of the polyethylene in the polyethylene resin.

(2) Properties of the First Polyolefin Resin (the Polyethylene Resin)

(a) Kinetic Melt Viscoelasticity

In general, the kinetic melt viscoelasticity of a resin is represented by an angular frequency $\omega_0$ at an intersection of a curve of a storage elastic modulus G' and an angular frequency ω and a curve of a loss elastic modulus G" and ω obtained by melt rheometry. In an embodiment, the polyethylene resin has an $\omega_0$ of at least about 0.01 rad/sec, or at least about 0.03 rad/sec, as measured by melt rheometry conducted at a constant temperature in a range of from about 160 to about 220° C. In another embodiment, $\omega_0$ ranges from about 0.01 rad/sec to about 10 rad/sec, or about 0.03 rad/sec to about 1 rad/sec.

The angular frequency $\omega_0$ can be measured by a melt rheometer under the following conditions.

(i) Measuring temperature: Constant within a range from about 160 to about 220° C., (ii) Fixing jig: Parallel plates (diameter: 8 mm), (iii) Gap (sample thickness): 0.3 mm, (iv) Measured angular frequency range: about 0.00628 to about 628 rad/sec, (v) Strain γ: about 0.5%, and (vi) Sample: A molding (thickness: about 0.5 mm, diameter: about 8 mm) melt-pressed at a temperature of about 180° C. was stabilized at the above measuring temperature, and then compressed to a thickness of about 0.3 mm.

A stress σ is detected by giving a strain γ to a sample while changing ω under the above conditions, and G' and G" (unit: Pa) are determined from σ, γ and their phase difference δ by the following formulae:

$$G'=(\sigma/\gamma)\cos \delta \quad (2) \text{ and}$$

$$G''=(\sigma/\gamma)\sin \delta \quad (3).$$

G' is an index representing the hardness of the polyethylene resin, and G" is an index representing the viscosity of the polyethylene resin. A log ω–log G' curve and a log ω–log G" curve are drawn as in FIG. 1, and an intersection of these curves is defined as an angular frequency $\omega_0$.

The parameter $\omega_0$ can depend on one or more of the following properties: weight-average molecular weight (Mw), the molecular weight distribution, the degree of branching, the molecular weight of branched chains, the distribution of branching points, the degree of molecular entanglement, the molecular weight between entangled points, etc. When polyethylene (homopolymer or ethylene-α-olefin copolymer) is linear and has a log-normal molecular weight distribution, a larger Mw leads to the smaller $\omega_0$. Also, when polyethylene (homopolymer or ethylene.α-olefin copolymer) has long-chain branches, $\omega_0$ tends to be relatively small. When $\omega_0$ is less than 0.01 rad/sec, it can be more difficult to produce a microporous polyolefin membrane having, e.g., sufficient pin puncture strength.

The UHMWPE and the second polyethylene having an $\omega_0$ in the appropriate range can be produced by, e.g., conventional methods, preferably, using a Ziegler-Natta catalyst.

(b) Molecular Weight Distribution Mw/Mn

Mw/Mn is a measure of a molecular weight distribution; the larger this value, the wider the molecular weight distribution. The choice of molecular weight distribution is not critical. For example, Mw/Mn can range e.g., from about 5 to about 300, or from about 5 to about 100, or from about 5 to about 30. Although it is not critical, when the Mw/Mn of the polyethylene resin is less than about 5, the a greater amount of polyethylene having a relatively high molecular weight is present, which can make it more difficult to extrude the polyolefin solution made from the resin. On the other hand, when the Mw/Mn is more than about 300, as is the case when the resin contains a significant amount of relatively low-molecular weight polyethylene, it can be more difficult to produce a microporous polyolefin membrane of sufficient strength.

Multi-stage polymerization can be used to obtain the desired Mw/Mn ratio in the polyethylene resin. For example, a two-stage polymerization method can be used, forming a relatively high-molecular-weight polymer component in the first stage, and forming a relatively low-molecular-weight polymer component in the second stage. While not required, this method can be used, for example, when the first polyethylene resin comprises UHMWPE. When the polyethylene resin comprises the UHMWPE and the second polyethylene, the desired Mw/Mn ratio of the polyethylene resin can be selected by adjusting the relative molecular weights and relative amounts of the first and second polyethylene.

(B) Second Polyolefin Resin

In addition to the polyethylene resin, a resin of at least a second polyolefin (the "second polyolefin resin") can be used to produce the polyolefin solution. Accordingly, in an embodiment, the polyolefin solution comprises a second polyolefin. In an embodiment, the second polyolefin (in resin form) is combined with the first polyolefin resin(s) to form a polyolefin composition, and then the polyolefin composition is combined with a process solvent to form a polyolefin solution, although this is not required. Alternatively, portions of one or more of the resins can be combined in sequence or in parallel with the process solvent to produce the polyolefin solution. The second polyolefin can be, e.g., at least one resin of the following polyolefins: polypropylene, polybutene-1, polypentene-1, poly-4-methylpentene-1, polyhexene-1, polyoctene-1, polyvinyl acetate, polymethyl methacrylate, polystyrene and ethylene.$\alpha$-olefin copolymer. The second polyolefin resin can contain homopolymers, copolymers of the second polyolefin and other $\alpha$-olefins, or both.

In an embodiment where the second polyolefin is used, the second polyolefin can, for example, have an Mw in the range of about $1 \times 10^4$ to about $4 \times 10^6$. In addition to or besides the second polyolefin, the polyolefin composition can further comprise a polyethylene wax, e.g., one having an Mw in the range of about $1 \times 10^3$ to about $1 \times 10^4$. When used, these species should be present in amounts less than an amount that would not cause significant deterioration in the desired properties (e.g., meltdown, shutdown, etc.) of the microporous polyolefin membrane.

When the second polyolefin is polypropylene, the polypropylene can optionally have one or more of the following properties: (i) the polypropylene has an Mw in a range of about $1 \times 10^4$ to about $4 \times 10^6$, or about $3 \times 10^5$ to about $3 \times 10^6$; (ii) the polypropylene has an Mw/Mn in a range of about 1.01 to about 100, or about 1.1 to about 50; (iii) the polypropylene's tacticity is isotactic; (iv) the polypropylene has a heat of fusion of at least about 90 Joules/gram; (v) polypropylene has a melting peak (second melt) of at least about 160° C., (vi) the polypropylene has a Trouton's ratio of at least about 15 when measured at a temperature of about 230° C. and a strain rate of 25 $\sec^{-1}$; and/or (vii) the polypropylene has an elongational viscosity of at least about 50,000 Pa sec at a temperature of 230° C. and a strain rate of 25 $\sec^{-1}$.

[2] Methods for Producing the Microporous Polyolefin Membrane

Having described the Composition and properties of the materials used for producing the microporous polyolefin membrane, the methods for producing such a membrane will now be described in more detail. Although not limited thereto, the invention will be described in terms of two production methods, a first production method and a second production method.

(A) First Production Method

In an embodiment, the invention relates to a first method for producing the microporous polyolefin membrane. The first method comprises the steps of (1) combining a polyolefin composition and a process solvent to make a polyolefin solution, (2) extruding the polyolefin solution through a die to make an extrudate, and cooling the extrudate to form a cooled extrudate, (3) stretching the cooled extrudate to form a stretched sheet, (4) removing the process solvent from the stretched sheet to form a solvent-removed sheet, and optionally drying the solvent-removed sheet; and (5) further stretching the solvent-removed sheet to form a re-stretched sheet and either heat setting or annealing the re-stretched sheet.

Following step (5), one or more optional steps such as an annealing or second annealing step [step (6)], cross-linking with ionizing radiations [step (7)], hydrophilizing [step (8)], coating [step (9)], etc., can be conducted, if desired. The order of the optional steps is not critical.

(1) Preparation of the Polyolefin Solution

The polyolefin resins as described above can be combined, e.g., by melt blending, with at least one process solvent (also called a diluent or a membrane-forming solvent) to prepare a polyolefin solution. The resin(s) and solvent(s) can be added sequentially, in parallel, or in a combination thereof. Alternatively, the polyolefin solution can produced by first combining at least a portion of the resins to make a polyolefin composition, and then combining the polyolefin composition with at least one membrane-forming solvent (and optionally additional portions of the resins and/or additional resins) to produce a polyolefin solution.

The polyolefin composition comprises polyolefin resins as described above that can be combined, e.g., by dry mixing or melt blending with an appropriate membrane-forming solvent to produce the polyolefin solution. Optionally, the polyolefin solution can contain various additives such as one or more antioxidant, fine silicate powder (pore-forming material), etc., provided these are used in a concentration range that does not significantly degrade the desired properties of the microporous polyolefin membrane.

The process solvent is preferably a solvent that is liquid at room temperature. While not wishing to be bound by any theory or model, it is believed that the use of a liquid solvent to form the first polyolefin solution makes it possible to conduct stretching of the cooled extrudate at a relatively high stretching magnification. In an embodiment, the process solvent can be at least one of aliphatic, alicyclic or aromatic hydrocarbons such as nonane, decane, decalin, p-xylene, undecane, dodecane, liquid paraffin, etc.; mineral oil distillates having boiling points comparable to those of the above hydrocarbons; and phthalates liquid at room temperature such as dibutyl phthalate, dioctyl phthalate, etc. In an embodiment where it is desired to obtain a cooled extrudate having a stable liquid solvent content, non-volatile liquid solvents such as liquid paraffin can be used, either alone or in combination with other solvents. Optionally, a solvent which is miscible with polyolefin in a melt blended state but solid at room temperature can be used, either alone or in combination with a liquid solvent. Such solid solvent can include, e.g., stearyl alcohol, ceryl alcohol, paraffin waxes, etc. Although it is not critical, it can be more difficult to evenly stretch the cooled extrudate or resulting membrane when the solution contains no liquid solvent.

The viscosity of the process solvent is not a critical parameter. For example, the viscosity of the liquid solvent can range from about 30 cSt to about 500 cSt, or from about 30 cSt to about 200 cSt, at 25° C. Although it is not a critical parameter, when the viscosity at 25° C. is less than about 30 cSt, it can be more difficult to prevent foaming the polyolefin solution, which can lead to difficulty in blending. On the other hand, when the viscosity is greater than about 500 cSt, it can be more difficult to remove the liquid solvent from the microporous polyolefin membrane.

In an embodiment, the resins, etc., used to produce to the polyolefin composition are melt-blended in, e.g., a double screw extruder or mixer. For example, a conventional extruder (or mixer or mixer-extruder) such as a double-screw extruder can be used to combine the resins, etc., to form the polyolefin composition. The process solvent can be added to the polyolefin composition (or alternatively to the resins used to produce the polyolefin composition) at any convenient point in the process. For example, in an embodiment where the polyolefin composition and the process solvent are melt-blended, the solvent can be added to the polyolefin composition (or its components) at any of (i) before starting melt-blending, (ii) during melt blending of the polyolefin composition, or (iii) after melt-blending, e.g., by supplying the process solvent to the melt-blended or partially melt-blended polyolefin composition in a second extruder or extruder zone located downstream of the extruder zone used to melt-blend the polyolefin composition.

When melt-blending is used, the melt-blending temperature is not critical. For example, the temperature of the polyolefin solution during melt-blending (the melt-blending temperature) can range, e.g., from about 10° C. higher than the melting point Tm of the polyethylene resin to about 120° C. higher than Tm. For brevity, such a range can be represented as Tm+10° C. to Tm+120° C. In an embodiment where the polyethylene resin has a melting point of about 130° C. to about 140° C., the melt-blending temperature can range from about 140° C. to about 250° C., or from about 170° C. to about 240° C.

When an extruder such as a double-screw extruder is used for melt-blending, the screw parameters are not critical. For example, the screw can be characterized by a ratio L/D of the screw length L to the screw diameter D in the double-screw extruder, which can range, for example, from about 20 to about 100, or from about 35 to about 70. Although this parameter is not critical, when L/D is less than about 20, melt-blending can be more difficult, and when L/D is more than about 100, faster extruder speeds might be needed to prevent excessive residence time of the polyolefin solution in the double-screw extruder (which can lead to undesirable molecular weight degradation). Although it is not a critical parameter, the cylinder (or bore) of the double-screw extruder can have an inner diameter of in the range of about 40 mm to about 100 mm, for example.

The amount of the polyolefin composition in the polyolefin solution is not critical. In an embodiment, the amount of polyolefin composition in the polyolefin solution can range from about 1 wt. % to about 75 wt. %, based on the weight of the polyolefin solution, for example from about 20 wt. % to about 70 wt. %. Although the amount of polyolefin composition in the polyolefin solution is not critical, when the amount is less than about 1 wt. %, it can be more difficult to produce the microporous polyolefin membrane at an acceptably efficient rate. Moreover, when the amount is less than 1 wt. %, it can be more difficult to prevent swelling or neck-in at the die exit during extrusion, which can make it more difficult to form and support the cooled extrudate. On the other hand, when the amount of polyolefin composition solution is greater than about 75 wt. %, it can be more difficult to form the cooled extrudate.

(2) Extrusion and Cooling the Extrudate

In an embodiment, at least a portion of the polyolefin solution is extruded through a die in order to form an extrudate. For example, the polyolefin solution can be extruded and then conducted directly from a first extruder to the die. In an alternative embodiment, additional extruders (second, third, etc.) can be used. The additional extruders can be connected in series and/or parallel with the first extruder. The product of the first extruder can be cooled and then palletized. Subsequently, the pellets can be, e.g., melt-blended and extruded through a second extruder and a die to make the gel-like molding or sheet. The selection of die geometry is not critical. For example, the die can be a sheet-forming die having a rectangular orifice, a double-cylindrical, hollow die, an inflation die, etc. The die gap is not critical. In the case of a sheet-forming die, the die generally has a gap of about 0.1 mm to about 5 mm. The temperature of the polyolefin solution during extrusion (the extrusion temperature) is not critical, and generally ranges from about 140° C. to about 250° C. The extruding speed is not critical, and generally ranges from about 0.2 m/minute to about 15 m/minute.

In an embodiment, the extrudate is cooled to form a cooled extrudate. Cooling can be conducted until the extrudate reaches the extrudate's gelation temperature (i.e., the temperature at which the extrudate sheet begins to gel) or lower at a cooling rate of at least about 50° C./minute. In an embodiment, the extrudate is cooled to a temperature of about 25° C. or lower. While not wishing to be bound by any theory or model, it is believed that the cooling results in the formation of micro-phases which comprise polyolefin regions separated by the membrane-forming solvent. Generally, it is believed that using a slower cooling rate provides the cooled extrudate with larger pseudo-cell units, resulting in a coarser higher-order structure. On the other hand, selecting a higher cooling rate results in denser cell units. When the rate is cooling less than 50° C./minute it can be more difficult to stretch the cooled extrudate (step 4), which is believed to result from increased membrane crystallinity. The choice of cooling method is not critical. Cooling methods can include, e.g., one or more of bringing the extrudate into direct contact with a cooling medium such as cooling air, cooling water, etc.; bringing the gel-like sheet into contact with rollers cooled by a cooling medium; etc.

(3) Stretching

In an embodiment, the cooled extrudate is stretched in at least one direction to form a stretched sheet. While not wishing to be bound by any theory or model, it is believed that the cooled extrudate can be more uniformly stretched when it contains the membrane-forming solvent. Neither the choice of stretching method nor the degree of stretching magnification are particularly critical. For example, any method can be used which is capable of stretching the cooled extrudate to a predetermined magnification (with or without optional heating). In an embodiment, the stretching is accomplished by one or more of tenter stretching, roller stretching or inflation stretching (e.g., with air). While the choice is not critical, the stretching can be conducted monoaxially or biaxially. Monoaxial stretching involves stretching the cooled extrudate in one planar direction, e.g., either the machine (i.e., longitudinal) direction or the transverse direction. Biaxial stretching involves stretching the cooled extrudate in two planar directions, e.g., both the machine direction (MD) and transverse direction (TD). In this context, the machine direction is a direction in the plane of the film (the cooled extrudate in this instance) which is oriented approximately along the direction of travel as the film is formed, i.e., the longest axis of the film during production. The transverse direction also lies in the plane of the film and is approximately perpendicular to both the machine direction and a third axis approximately parallel to the thickness of the film.

In an embodiment, biaxial stretching is used. In the case of biaxial stretching (also called biaxial orientation), the stretching can be simultaneous biaxial stretching, sequential stretching along one axis and then the other or multi-stage stretching (for instance, a combination of the simultaneous biaxial stretching and the sequential stretching). In one embodiment, simultaneous biaxial stretching is used.

The stretching magnification is not critical. In an embodiment, where monoaxial stretching is used, the linear stretching magnification can be about 2 fold or more, or about 3 fold to about 30 fold. In an embodiment, where biaxial stretching is used, the linear stretching magnification can be, e.g., at least about 3 fold in at last two planar directions, e.g., the machine direction and transverse direction. In another embodiment, the area magnification resulting from biaxial stretching is at least about 9 fold or at least about 16 fold, or at least about 25 fold. While it is not critical, when the stretching results in an area magnification of at least about 9 fold, it is less difficult to produce a microporous polyolefin membrane having a relatively high pin puncture strength. When the stretching results in an area magnification of more than 400 fold, it can be more difficult to operate the stretching apparatus without tearing the cooled extrudate.

Regardless of whether the polyethylene resin forming the gel-like sheet is ultra-high-molecular-weight polyethylene, the other polyethylene or the polyethylene composition, the stretching temperature is 118° C. or higher, preferably in a range of 118° C. to the melting point Tm of the polyethylene resin+10° C., more preferably in a range of 118° C. or higher and lower than the melting point Tm. The stretching temperature lower than 118° C. provides low heat shrinkage resistance at 105° C. and low melt shrinkage resistance. When the stretching temperature is higher than the melting point Tm+10° C., the polyethylene resin is molten, failing to orient molecular chains by stretching.

The UHMWPE, the second polyethylene, and the polyethylene composition (which comprises UHMWPE and the second polyethylene) generally have a Tm of about 130° C. to 140° C. and Tcd of about 90° C. to 100° C. Tcd can be determined from the temperature characteristics of the kinetic viscoelasticity measured according to ASTM D-4065.

While not wishing to be bound by any theory or model, it is believed that such stretching causes cleavage between polyethylene lamellas, making the polyethylene phases finer and forming a large number of fibrils. Consequently, the stretching generally makes it easier to produce a relatively high mechanical strength microporous polyolefin membrane with a relatively large pore size. Such microporous polyolefin membranes are believed to be particularly suitable for use as battery separators.

Optionally, stretching can be conducted in the presence of a temperature gradient in a thickness direction (i.e., a direction approximately perpendicular to the planar surface of the microporous polyolefin membrane). In this case, it can be easier to produce a microporous polyolefin membrane with improved mechanical strength. The details of this method are described in Japanese Patent No. 3347854.

(4) Removal of Process Solvent

In an embodiment, at least a portion of the process solvent is removed (or displaced) from the stretched sheet in order to form a solvent-removed sheet. A second solvent (also called a "displacing" or "washing" solvent) can be used to remove (wash away, or displace) the process solvent. While not wishing to be bound by any theory or model, it is believed that because the polyolefin phases in the stretched sheet produced are separated from the process solvent phase, the removal of the process solvent provides a porous membrane constituted by fibrils forming a fine three-dimensional network structure and having pores communicating three-dimensionally and irregularly.

The choice of washing solvent is not critical provided it is capable of dissolving or displacing the process solvent. Suitable washing solvents include, for instance, one or more volatile solvents such as saturated hydrocarbons including pentane, hexane, heptane, etc.; chlorinated hydrocarbons such as methylene chloride, carbon tetrachloride, etc.; ethers such as diethyl ether, dioxane, etc.; ketones such as methyl ethyl ketone, etc.; linear fluorocarbons such as trifluoroethane, $C_6F_{14}$, $C_7F_{16}$, etc.; cyclic hydrofluorocarbons such as $C_5H_3F_7$, etc.; hydrofluoroethers such as $C_4F_9OCH_3$, $C_4F_9OC_2H_5$, etc.; and perfluoroethers such as $C_4F_9OCF_3$, $C_4F_9OC_2F_5$, etc.

The method of removing the process solvent is not critical, and any method capable of removing a significant amount of solvent can be used, including conventional solvent-removal methods. For example, the stretched sheet can be washed by immersing the sheet in the washing solvent and/or showering the sheet with the washing solvent. The amount of washing solvent used is not critical, and will generally depend on the method selected for removal of the membrane-forming solvent. For example, the washing solvent can be in an amount in a range of about 300 parts by weight to about 30,000 parts by weight, based on the weight of the stretched sheet. While it is generally desirable to do so, it is not necessary to remove all of the process solvent from the stretched sheet. When a significant amount of solvent remains in the stretched sheet after the solvent-removal step, it can be more difficult to produce a membrane of the desired porosity. Consequently, in one embodiment the membrane-forming solvent is removed from the stretched sheet until the amount of the remaining process solvent in the stretched sheet becomes less than 1 wt. %, based on the weight of the stretched sheet. Optionally, the solvent-removed sheet can be dried.

When drying is used, the solvent-removed sheet can be dried by any method capable of removing at least a portion of the washing solvent (or any other volatile species) in order to form a dried sheet. For example, the membrane can be dried by a heat-drying method, a wind-drying (moving air) method, etc. The drying temperature is not critical, and can be, e.g., equal to or lower than the above Tcd, or optionally 5° C. or more lower than the Tcd (ASTM D-4065). The UHMWPE, the second polyethylene and the polyethylene composition have crystal dispersion temperatures in the range of about 90 to about 100° C. Drying is conducted until the remaining washing solvent becomes preferably 5% or less by weight, more preferably 3% or less by weight, per 100% by weight (on a dry basis) of the microporous polyolefin membrane. Insufficient drying undesirably leads to a decrease in the porosity of the microporous polyolefin membrane by a subsequent heat treatment, resulting in poor permeability.

(5) Re-Stretching

The dried sheet is further stretched (also called re-stretching or dry stretching to distinguish this step from the stretching of step (3)) at least monoaxially, i.e., in at least one lateral (planar) direction. The choice of stretching method is not critical, and conventional stretching methods can be used, e.g., mechanical stretching using tenter-clips, etc.

While the choice is not critical, the stretching can be conducted monoaxially or biaxially. When biaxial stretching is used, the stretching can be conducted simultaneously in approximately orthogonal planar directions (e.g., the machine direction and the transverse direction) or sequentially in one planar direction and then another. In an embodiment, simultaneous biaxial stretching is used. Incidentally, because the re-stretching is usually conducted on the microporous membrane in a long sheet form, which is obtained from the stretched gel-like sheet, the directions of MD and TD in the re-stretching is the same as those in the stretching of the gel-like sheet. This is true in other production methods.

Optionally, the re-stretching can be conducted while the sheet is at an elevated temperature (the "re-stretching temperature"). The re-stretching temperature can be, e.g., about 127° C. or lower, or in a range from the crystal dispersion temperature Tcd of the polyethylene resin to 127° C.

When the re-stretching temperature is higher than about 127° C., it can be more difficult to produce a microporous polyolefin membrane having a relatively high permeability and a relatively low shrinkage ratio, immediately before melting. When the re-stretching temperature is lower than Tcd, it can be more difficult to soften the polyolefin in the microporous polyolefin membrane, which can lead to tearing during dry stretching and a lack of magnification uniformity during dry stretching. In an embodiment, the re-stretching magnification ranges from about 1.3 fold to about 1.5 fold in at least one planar direction. In the case of monoaxial stretching, the linear magnification ranges from about 1.3 fold to about 1.5 fold in a planar direction, e.g., a direction approximately parallel to the longitudinal (machine) or transverse directions of the sheet. For example, the solvent-removed sheet can be stretched in at least one lateral direction at a membrane temperature of about 127° C. or lower from an initial length in the stretching direction $L_1$ to a final length in the stretching direction $L_2$ such that $1.3L_1 \leq L_2 \leq 1.5L_1$.

In the case of biaxial stretching, the magnifications can be in a range of about 1.3 fold to about 1.5 fold in both the longitudinal and the transverse directions. The magnifications in, e.g., the longitudinal and transverse directions are independently selected, and can be the same or different. In an embodiment, biaxial stretching is used, with the same magnification selected for the longitudinal and transverse directions.

When the stretching magnification is less than about 1.3 fold, it can be more difficult to produce a microporous polyolefin membrane having sufficient permeability. On the other hand, when the stretching magnification is more than about 1.5 fold, it can be more difficult to produce a microporous polyolefin membrane having sufficient heat shrinkage resistance at 105° C. and melt shrinkage resistance. Following the further stretching, the re-stretched sheet can be heat-set to produce the membrane.

Heat-setting involves heating the sheet while a load (either tension or compression) is applied to the sheet. It is believed that the heat-setting stabilizes polyolefin crystals in the sheet, resulting in uniform lamellas. The temperature of the sheet during heat-setting (the heat-setting temperature) can be conducted, e.g., at a temperature of about 127° C. or lower, or from about 60° C. to 127° C. When the heat-setting temperature is higher than 127° C., it can be more difficult to produce a microporous membrane of sufficient permeability and porosity. The choice of heat-setting method is not critical, and it can be conducted, e.g., by conventional heat-setting methods such as by using a tenter method or a roller method.

(6) Annealing

While not required, the microporous polyolefin membrane can be annealed. The annealing differs from heat-setting in that annealing is a heat treatment with no load applied to the sheet. The choice of annealing method is not critical, and conventional annealing methods can be used. For example, annealing can be conducted by using a heating chamber with a belt conveyer or an air-floating-type heating chamber. The annealing can be conducted continuously after the heat-setting with the tenter slackened.

The temperature of the microporous polyolefin membrane during annealing (the annealing temperature) is not critical, and can range, e.g., from about 127° C. or lower, or from about 60° C. to 127° C. When the annealing temperature is higher than 127° C., it can be more difficult to produce a microporous polyolefin membrane of sufficient permeability and porosity. Depending on the conditions used, the microporous polyolefin membrane might shrink during annealing, but this is acceptable. Annealing under these conditions can make it less difficult to limit the shrinkage ratio of the membrane to a range of about 50% or less, or about 30% or less, in at least one planar direction of the membrane. The shrinkage ratio is measured along an axis of the membrane (e.g., the machine direction axis, the transverse direction axis), and is equal to the size of the membrane in the selected direction before annealing divided by the size of the membrane in the same direction after annealing, multiplied by 100%.

(7) Cross-Linking

In an embodiment, the microporous polyolefin membrane can be cross-linked, e.g., by ionizing radiation rays such as α-rays, β-rays, γ-rays, electron beams, etc. In the case of irradiating electron beams, the amount of electron beams can be, e.g., about 0.1 to 100 Mrad, and the accelerating voltage can be, e.g., about 100 to about 300 kV. Using a cross-linking treatment can make it less difficult to produce a microporous polyolefin membrane with a sufficiently elevated melt-down temperature.

(8) Hydrophilizing Treatment

In an embodiment, the microporous polyolefin membrane can be subjected to a hydrophilizing treatment, i.e., a treatment capable of making the microporous polyolefin membrane more hydrophilic. The hydrophilizing treatment can be. e.g., one or more of a monomer-grafting treatment, a surfactant treatment, a corona-discharging treatment, etc. When a monomer-grafting treatment is used, it can be conducted after the cross-linking treatment.

In an embodiment where a surfactant treatment is used, the surfactant can be at least one of a nonionic surfactant, a cationic surfactant, an anionic surfactant, or an amphoteric surfactant. In an embodiment, a nonionic surfactant is used. The method used to apply the surfactant is not critical. For example, the microporous polyolefin membrane can be dipped in a solution of the surfactant in water or in a lower alcohol such as methanol, ethanol, isopropyl alcohol, etc., or coated with the solution by, e.g., a doctor blade method.

(9) Surface-Coating

To provide the heat-set microporous membrane with improved meltdown properties when used as a battery separator, the membrane can be covered or coated with a porous material. For example, porous polypropylene, porous fluororesins such as polyvinylidene fluoride and polytetrafluoroethylene, porous polyimides, porous polyphenylene sulfide, etc. can be used. The Mw of the coating material is not critical, and can, e.g., range from about 5,000 to about 500,000. The solubility of the coating material is not critical, and can range, e.g., from about 0.5 g or more in 100-g toluene at 25° C. In an embodiment, the coating material is polypropylene. The polypropylene can have, e.g., a racemic-diade fraction in the range from about 0.12 to about 0.88. The racemic-diade is a structure unit having two monomer units, which are connected in an enantiomeric relation to each other. The surface coating layer can be formed, for instance, by coating the microporous membrane with a coating solution. The coating solution can be made by combining a resin of the coating material with a good solvent, removing the good solvent to increase the concentration of the resin, thereby forming a structure in which a resin phase is separated from a good solvent phase, and removing the remaining good solvent.

(B) Second Production Method

The second method for producing the microporous polyolefin membrane generally comprises, the same steps (1) through (4) as in the first production method. The second method differs from the first in the use of different stretching and heating conditions. Following annealing, one or more of the above-described heat-setting, cross-linking, hydrophilizing treatment, or coating steps can be conducted, if desired, in any order.

The re-stretching step of the second production method can be conducted under the same conditions as in the first production method (A), except that the further stretching is conducted in two stages. In the first stage, the sheet is re-stretched to a re-stretching magnification of the second production method ranges from 1.31 fold to 2 fold. For example, the solvent-removed sheet is further stretched in at least one lateral direction at a membrane temperature of about 127° C. or lower from an initial length (before the further stretching) in the stretching direction $L_1$ to a second length in the stretching direction $L_2$ such that $1.31L_1 \leq L_2 \leq 2L_1$, and then in a second stage the re-stretched sheet is annealed as described below. The re-stretching temperature can be, e.g., in a range of from about the crystal dispersion temperature Tcd of the polyethylene to about 127° C.

The annealing stage can be conducted with the sheet at a temperature in the range of about 60° C. to about 127° C. with no load applied to the sheet, e.g., with the tenter clips slackened. The annealing can be conducted such that $1.30 L_1 \leq L_3 \leq 1.5L_1$, wherein $L_3$ represents the length in the stretching direction of the re-stretched sheet after annealing and $L_1$ has the same value as described above for the first stage. When $L_3 < 1.3L_1$, it is more difficult to produce a microporous polyolefin membrane of sufficient permeability. In the case of $L_3 > 1.5L_1$, it is more difficult to produce a microporous polyolefin membrane having sufficient heat shrinkage resistance at 105° C. and sufficient melt shrinkage resistance. The other conditions of the annealing step can be the same as those in the first method (A).

[3] Properties and Composition of the Microporous Polyolefin Membrane (A) Membrane Properties In an embodiment the invention relates to a microporous polyolefin membrane comprising the polyethylene, and having all of the following properties:

an air permeability in a range of about 20 sec/100 cm³ to 100 sec/100 a pin puncture strength of 2,450 mN or more, and a heat shrinkage ratio of 12% or less at 105° C.

The membrane can be a relatively thick membrane, e.g., the membrane can have a thickness of at least about 23 μm.

These properties will now be described in more detail; optional properties will also be described.

(1) Average Thickness of 23 μm or More

In an embodiment, the microporous polyolefin membrane has an average thickness of at least about 23 μm. In an embodiment, the average thickness ranges from about 23 to about 50 μm, or from about 23 to about 35 μm. Membrane thickness can be measured, e.g., by a contact thickness meter at 5 mm intervals along the machine direction of the membrane over the width of the membrane, and averaging the measurement results. When the thickness is less than 23 μm, it is more difficult to produce a microporous polyolefin membrane having sufficient protection against internal short-circuiting, particularly in batteries intended for HEV-use. The average thickness of the microporous membrane can be controlled mainly by the proper adjustment of the thickness of the extrudate and the stretching magnification in the above production methods.

(2) Porosity of 50-90%

When the porosity of the microporous polyolefin membrane is less than about 50%, it can be more difficult to produce a battery having sufficient electrolyte transport properties, particularly HEV-batteries. If the porosity were more than 90%, it can be more difficult to produce a microporous polyolefin membrane that is strong enough to use as a separator in HEV batteries, which generally need relatively strong separators for significant protection against internal short-circuiting. In an embodiment, the membrane's porosity ranges from about 50% to about 80%.

(3) Air Permeability of 20 to 100 Seconds/100 cm³

The microporous polyolefin membrane generally has an having an air permeability in a range of about 20 to about 100 seconds/100 cm³, normalized to a membrane thickness of 20 μm. Air permeability is determined according to JIS P8117, using, e.g., an Oken-type air permeability meter (EGO-1T available from Asahi Seiko K. K.), as follows: $P_1$ measured on a microporous membrane having a thickness $T_1$ according to JIS P8117 is converted to air permeability $P_2$ at a thickness of 20 μm by the equation of $P_2=(P_1 \times 20)/T_1$. When the membrane air permeability ranges from about 20 seconds/100 cm³ to about 100 seconds/100 cm³, it is generally less difficult to produce an HEV battery having a relatively large capacity and good cyclability. When the air permeability is more than 100 seconds/100 cm³, in can be more difficult to produce a battery of sufficient capacity. When the air permeability is less than 20 seconds/100 cm³, it can be more difficult to produce a battery having sufficient shut-down protection when the battery has an elevated internal temperature.

(4) Pin Puncture Strength of 2,450 mN or More (Converted to the Value at 20-μm Thickness)

When the pin puncture strength (converted to the value at 20-μm thickness) of the microporous polyolefin membrane is less than 2,450 mN, it is more difficult to produce an HEV battery having sufficient protection against internal short-circuiting. In an embodiment, the pin puncture strength of the microporous polyolefin membrane is at least about 2,750 mN. The value of pin puncture strength is normalized to a membrane thickness of 20 µm. The measurement can be made as follows: the maximum load is measured when a membrane having a thickness of $T_1$ is pricked with a needle of 1 mm in diameter with a spherical end surface (radius R of curvature: 0.5 mm) at a rate of 2 mm/second. The measured maximum load $L_1$ was converted to the maximum load $L_2$ at a thickness of 20 µm by the equation of $L_2=(L_1\times 20)/T_1$, to determine the pin puncture strength.

(5) Tensile Rupture Strength of at Least about 49,000 kPa

When the tensile rupture strength of the microporous polyolefin membrane (measured according to ASTM D-882) is at least about 49,000 kPa in both longitudinal and transverse directions, it is less difficult to make a separator that will break during REV battery manufacturing and/or use. Tensile rupture strength can be measured, e.g., on a rectangular test piece having a width of 10 mm according to ASTM D882.

(6) Heat Shrinkage Ratio of 12% or Less

When the heat shrinkage ratio of the microporous polyolefin membrane (after the membrane has been heated to about 105° C. for 8 hours) exceeds about 12% in both longitudinal and transverse directions, it can be more difficult produce a battery that is sufficiently resistant to internal short-circuiting, especially near the edges of the separators. In an embodiment, the heat shrinkage ratio is less than about 10% in both the longitudinal and the transverse directions, particularly when the membrane is used as a separator for HEV batteries. The shrinkage ratio can be determined, e.g., by measuring the membrane dimensions three times in both longitudinal and transverse directions after maintaining a membrane temperature 105° C. for 8 hours, and averaging the measured shrinkages.

(7) Maximum Shrinkage Ratio of 25% or Less Immediately Before Melting

Figure 2:
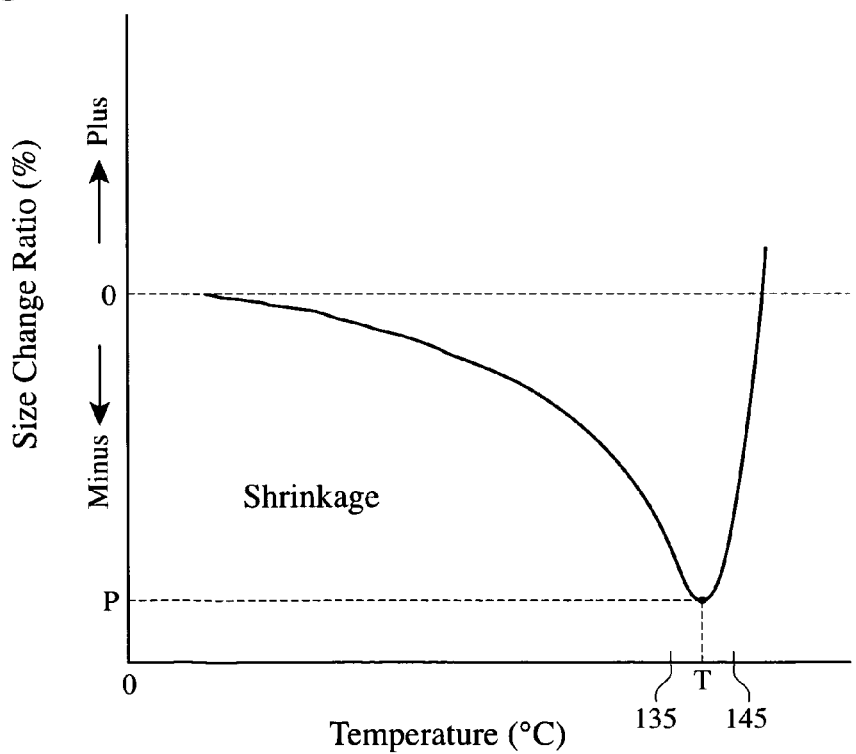
FIG. 2 is a graph schematically showing a curve of size change ratio relative to temperature for determining the maximum shrinkage ratio immediately before melting.

As is clear from FIG. 2, the microporous membrane continues shrinking when heated under a load, and reaches the maximum size change ratio (shrinkage ratio) at a temperature T. When this temperature is exceeded, the microporous membrane rapidly elongates. While not wishing to be bound by any theory or model, it is believed that this effect results from all or a portion of the membrane being in the molten state under these conditions. The maximum shrinkage ratio at a membrane temperature T (immediately before melting) is an index of the melt shrinkage resistance.

When the maximum shrinkage ratio immediately before melting of the microporous membrane in transverse direction exceeds about 25% (at a membrane temperature in the range of about 135° C. to about 145° C.), it can be more difficult to make an HEV having sufficient protection against internal short circuiting since the battery's separators will tend to shrink at the edges, potentially resulting in direct contact between the anode and cathode.

Maximum shrinkage ratio can be measured as follows: a rectangular sample of 3 mm×50 mm was cut out of the membrane such that the longitudinal direction of the sample is aligned with the transverse direction of the membrane, and set in a thermomechanical analyzer (TMA/SS6000 available from Seiko Instruments, Inc.) at a chuck distance of 10 mm. With a load of 2 gf applied to a lower end of the sample, the temperature was elevated at a rate of 5° C./minute to measure the membrane's size change. A size change ratio was calculated relative to the size at 23° C., to obtain a temperature-size change ratio curve shown in FIG. 2. The maximum P of a shrinkage ratio in a temperature of 135° C. to 145° C. was defined as "maximum shrinkage ratio immediately before melting."

The composition of the microporous polyolefin membrane will now be described in more detail.

(B) Membrane Composition

In an embodiment, the microporous polyolefin membrane comprises (a) an ultra-high-molecular-weight polyethylene and/or (b) a second polyethylene having a lower molecular weight than the ultra-high-molecular-weight polyethylene.

The microporous polyolefin membrane generally comprises the polyolefin used to form the polyolefin solution. A small amount of washing solvent and/or membrane-forming solvent can also be present, generally in amounts less than 1 wt % based on the weight of the microporous polyolefin membrane. A small amount of polyolefin molecular weight degradation might occur during processing, but this is acceptable. In an embodiment, molecular weight degradation during processing, if any, causes the value of Mw/Mn of the polyolefin in the membrane to differ from the Mw/Mn of the polyolefin solution by no more than about 50%, or no more than about 10%, or no more than about 1%, or no more than about 0.1%.

Therefore, in an embodiment, the microporous polyolefin membrane comprises UHMWPE having, e.g., an Mw of at least about $1\times 10^6$. The UHMWPE can be an ethylene homopolymer, or an ethylene α-olefin copolymer containing a small amount of a first α-olefin, which is not ethylene. In an embodiment, the first α-olefin (when present) comprises at least one of propylene, butene-1, pentene-1, hexene-1,4-methylpentene-1, octene-1, vinyl acetate, methyl methacrylate, or styrene. In an embodiment, the Mw of the ultra-high-molecular-weight polyethylene ranges from about $1\times 10^6$ to about $15\times 10^6$, or about $1\times 10^6$ to about $5\times 10^6$, or about $1\times 10^6$ to about $3\times 10^6$.

In an embodiment, the microporous polyolefin membrane comprises the second polyethylene, e.g., one having an Mw in a range of about $1\times 10^4$ to about $5\times 10^5$. For example, the second polyethylene can comprise at least one of high-density polyethylene, medium-density polyethylene, branched low-density polyethylene and linear low-density polyethylene. In an embodiment, the second polyethylene is high-density polyethylene. When the second polyethylene is high-density polyethylene, the Mw generally ranges from about $1\times 10^5$ to about $5\times 10^5$, or optionally, about $2\times 10^5$ to about $4\times 10^5$. The second polyethylene can be an ethylene homopolymer, or a copolymer containing small amounts of a second α-olefin such as at least one of propylene, butene-1, hexene-1, etc. In an embodiment, the second polyethylene (either the homopolymer, copolymer, or both) are produced using single-site catalysts.

In an embodiment, the polyethylene in the microporous polyolefin membrane consists essentially of (or alternatively consists of) the UHMWPE and the second polyethylene. In another embodiment, the polyethylene comprises the ultra-high molecular weight polyethylene and high-density polyethylene. The UHMWPE and the second polyethylene generally have the same properties and characteristics as described above in the discussion of the polyolefin composition.

In addition to the polyethylene, the microporous polyolefin membrane can further comprise a second polyolefin. The second polyolefin can be selected from at least one of polypropylene, polybutene-1, polypentene-1, poly-4-methylpentene-1, polyhexene-1, polyoctene-1, polyvinyl acetate, polymethyl methacrylate, polystyrene and ethylene.α-olefin copolymer. The second polyolefin can be a homopolymer, copolymer of the second polyolefin and other α-olefins, or both.

In an embodiment where the second polyolefin is used, the second polyolefin can, for example, have an Mw in the range of about $1 \times 10^4$ to about $4 \times 10^6$.

In addition to or besides the second polyolefin, the microporous polyolefin membrane can further comprise a polyethylene wax, e.g., one having an Mw in the range of about $1 \times 10^3$ to about $1 \times 10^4$.

[4] Battery Separator

Because the microporous polyolefin membrane of the present invention can be thick and has suitable permeability, pin puncture strength and heat shrinkage resistance, it is capable of use as a battery separator, particularly separators for an HEV battery.

[5] Battery

In an embodiment, the microporous polyolefin membrane can be used as a separator for primary and secondary batteries such as lithium ion secondary batteries, lithium-polymer secondary batteries, nickel-hydrogen secondary batteries, nickel-cadmium secondary batteries, nickel-zinc secondary batteries, silver-zinc secondary batteries, and particularly for lithium ion secondary batteries. For the sake of brevity, the following description will focus on lithium ion secondary batteries, although the invention is not limited thereto.

The lithium secondary battery comprises a cathode, an anode, and a separator located between the anode and the cathode. The separator generally contains an electrolytic solution (electrolyte). The electrode structure is not critical, and conventional electrode structures can be used. The electrode structure can be, for instance, a coin type having a disc-shaped cathode and a disc-shape anode, a laminate type in which a planar cathode and anode are alternately laminated with at least one separator situated between the anode and the cathode, a toroidal type in which ribbon-shaped cathode and anode are wound, etc.

The cathode generally comprises a current collector, and a cathodic-active material layer capable of absorbing and discharging lithium ions, which is formed on the current collector. The cathodic-active materials can be, e.g., inorganic compounds such as transition metal oxides, composite oxides of lithium and transition metals (lithium composite oxides), transition metal sulfides, etc. The transition metals can be, e.g., V, Mn, Fe, Co, Ni, etc. In an embodiment, the lithium composite oxides are lithium nickelate, lithium cobaltate, lithium manganate, laminar lithium composite oxides based on α-NaFeO$_2$, etc. The anode generally comprises a current collector, and a negative-electrode active material layer formed on the current collector. The negative-electrode active materials can be, e.g., carbonaceous materials such as natural graphite, artificial graphite, cokes, carbon black, etc.

The electrolytic solutions can be obtained by dissolving lithium salts in organic solvents. The choice of solvent and/or lithium salt is not critical, and conventional solvents and salts can be used. The lithium salts can be, e.g., LiClO$_4$, LiPF$_6$, LiAsF$_6$, LiSbF$_6$, LiBF$_4$, LiCF$_3$SO$_3$, LiN(CF$_3$SO$_2$)$_2$, LiC(CF$_3$SO$_2$)$_3$, Li$_2$B$_{10}$Cl$_{10}$, LiN(C$_2$F$_5$SO$_2$)$_2$, LiPF$_4$(CF$_3$)$_2$, LiPF$_3$(C$_2$F$_5$)$_3$, lower aliphatic carboxylates of lithium, LiAlCl$_4$, etc. The lithium salts may be used alone or in combination. The organic solvents can be organic solvents having relatively high boiling points (compared to the battery's shutdown temperature) and high dielectric constants. Suitable organic solvents include ethylene carbonate, propylene carbonate, ethylmethyl carbonate, γ-butyrolactone, etc.; organic solvents having low boiling points and low viscosity such as tetrahydrofuran, 2-methyltetrahydrofuran, dimethoxyethane, dioxolane, dimethyl carbonate, diethyl carbonate, and the like, including mixtures thereof. Because the organic solvents generally having high dielectric constants generally also have a high viscosity, and vice versa, mixtures of high- and low-viscosity solvents can be used.

When the battery is assembled, the separator is generally impregnated with the electrolytic solution, so that the separator (microporous membrane) is provided with ion permeability. Alternatively, the battery can be impregnated with electrolyte prior to assembly. The choice of impregnation method is not critical, and conventional impregnation methods can be used. For example, the impregnation treatment can be conducted by immersing the microporous membrane in an electrolytic solution at room temperature.

The method selected for assembling the battery is not critical, and conventional battery-assembly methods can be used. For example, when a cylindrical battery is assembled, a cathode sheet, a separator formed by the microporous membrane and an anode sheet are laminated in this order, and the resultant laminate is wound to a toroidal-type electrode assembly. A second separator might be needed to prevent short-circuiting of the toroidal windings. The resultant electrode assembly can be deposited into a battery can and then impregnated with the above electrolytic solution, and a battery lid acting as a cathode terminal provided with a safety valve can be caulked to the battery can via a gasket to produce a battery.

The following examples further describe embodiments of the invention.

[6] Examples

Example 1

99.625 parts by mass of a polyethylene (PE) composition comprising 18% by mass of ultra-high-molecular-weight polyethylene (UHMWPE) having a weight-average molecular weight (Mw) of $2.5 \times 10^6$, and 82% by mass of high-density polyethylene (HDPE) having Mw of $2.8 \times 10^5$, were dry-blended with 0.375 parts by mass of tetrakis[methylene-3-(3, 5-ditertiary-butyl-4-hydroxyphenyl)-propionate] methane as an antioxidant. The melt rheometry of the PE composition by RheoStress-300 (available from Haake) at 180° C. revealed that an angular frequency $\omega_0$, at which storage elastic modulus G' and loss elastic modulus G" were equal, was 0.114 rad/sec. The measurement of the same PE composition also revealed that it had a melting point of 135° C. and a crystal dispersion temperature Tcd of 90° C.

The Mws of UHMWPE and HDPE were measured by a gel permeation chromatography (GPC) method under the following conditions.

Measurement apparatus: GPC-150C available from Waters Corporation,
Column: Shodex UT806M available from Showa Denko K.K.,
Column temperature: 135° C.,
Solvent (mobile phase): o-dichlorobenzene,
Solvent flow rate: 1.0 ml/minute,
Sample concentration: 0.1% by mass (dissolved at 135° C. for 1 hour),
Injected amount: 500 μl,
Detector: Differential Refractometer available from Waters Corp., and Calibration curve: Produced from a calibration curve of a single-dispersion, standard polystyrene sample using a predetermined conversion constant.

25 parts by mass of the resultant mixture was charged into a strong-blending double-screw extruder having an inner diameter of 58 mm and L/D of 52.5, and 75 parts by mass of liquid paraffin (50 cst at 40° C.) was supplied to the double-screw extruder via a side feeder. Melt-blending was conducted at 230° C. and 250 rpm to prepare a polyethylene solution. The polyethylene solution was extruded from a T-die mounted to a tip end of the double-screw extruder, and drawn and cooled by cooling rolls controlled at 50° C. while reeling up, to form a gel-like sheet having a thickness of 1.6 mm. Using a tenter-stretching machine, the gel-like sheet was simultaneously biaxially stretched at 118.5° C., such that the stretching magnification was 5 fold in both longitudinal and transverse directions.

The stretched gel-like sheet was fixed to an aluminum frame of 20 cm×20 cm and immersed in a washing bath of methylene chloride controlled at 25° C., and washed with the vibration of 100 rpm for 3 minutes to remove the liquid paraffin. The washed gel-like sheet was dried by air at room temperature, and re-stretched to 1.4 fold in a transverse direction at 123° C. by a batch-stretching machine. The re-stretched sheet was heat-set at 123° C. for 10 minutes while being fixed to the batch-stretching machine, to produce a microporous polyethylene membrane having an average thickness of 25.0 μm. The average thickness of the microporous membrane was measured by a contact thickness meter at a 2.5-mm, longitudinal interval over the width of 10.5 cm, and averaged.

Example 2

A microporous polyethylene membrane having an average thickness of 24.7 μm was produced in the same manner as in Example 1, except that the stretching temperature was 119.5° C., that the re-stretching conditions were a temperature of 122.5° C. and a magnification of 1.6 fold in a transverse direction, and that annealing was conducted at 122.5° C. such that the length in a transverse direction became 1.4 fold that before re-stretching.

Example 3

APE composition comprising 30% by mass of UHMWPE and 70% by mass of HDPE was prepared. This PE composition had $\omega_0$ of 0.0343 rad/sec, a melting point of 135° C., and a crystal dispersion temperature Tcd of 100° C. A microporous polyethylene membrane having an average thickness of 25.6 μm was produced from this composition in the same manner as in Example 1, except that the concentration of a polyethylene solution was 23% by mass, that the re-stretching conditions were a temperature of 123° C. and a magnification of 1.6 fold in a transverse direction, and that annealing was conducted at 123° C. such that the length in a transverse direction became 1.4 times that before re-stretching.

Example 4

A microporous polyethylene membrane having an average thickness of 25.0 μm was produced in the same manner as in Example 1, except that the stretching temperature was 119.7° C., that the re-stretching conditions were a temperature of 126.3° C. and a magnification of 1.45 fold in a transverse direction, and that the heat-setting temperature was 126.3° C.

Example 5

A microporous polyethylene membrane having an average thickness of 25.0 μm was produced in the same manner as in Example 1, except that the stretching temperature was 118° C., that the re-stretching conditions were a temperature of 124.5° C. and a magnification of 1.45 fold in a transverse direction, that the heat-setting temperature was 124.5° C.

Comparative Example 1

A PE composition comprising 18% by mass of UHMWPE having Mw of $2.5\times10^6$ and 82% by mass of HDPE having Mw of $2.5\times10^5$ was prepared. This PE composition had $\omega_0$ of 0.0038 rad/sec, a melting point of 135° C., and a crystal dispersion temperature Tcd of 90° C. A microporous polyethylene membrane having an average thickness of 30.0 μm was produced from this composition in the same manner as in Example 1, except that the gel-like sheet was as thick as 1.7 mm, that the stretching temperature was 119.7° C., and that the re-stretching temperature and the heat-setting temperature were both 110° C.

Comparative Example 2

A microporous polyethylene membrane having an average thickness of 26.0 μm was produced in the same manner as in Example 1, except that the gel-like sheet was as thick as 1.8 mm, that the stretching temperature was 119.7° C., and that both the re-stretching temperature and the heat-setting temperature were 125° C.

Comparative Example 3

A microporous polyethylene membrane having an average thickness of 25.4 μm was produced in the same manner as in Example 1, except that the stretching temperature was 118° C., and that the re-stretching temperature and the heat-setting temperature were both 127.5° C.

Comparative Example 4

A microporous polyethylene membrane having an average thickness of 23.8 μm was produced in the same manner as in Example 1, except that the stretching temperature was 115.5° C., and that the re-stretching temperature and the heat-setting temperature were both 128° C.

Comparative Example 5

A microporous polyethylene membrane having an average thickness of 24.1 μm was produced in the same manner as in Example 1, except that the stretching temperature was 119.2° C., and that the re-stretching temperature and the heat-setting temperature were both 128° C.

Comparative Example 6

A microporous polyethylene membrane having an average thickness of 25.0 μm was produced in the same manner as in Example 1, except that the stretching temperature was 117° C., that the re-stretching conditions were a temperature of 124.5° C. and a magnification of 1.45 fold in a transverse direction, and that the heat-setting temperature was 124.5° C.

Comparative Example 7

A microporous polyethylene membrane having an average thickness of 25.0 μm was produced in the same manner as in Example 1, except that stretching temperature was 118° C., that the re-stretching conditions were a temperature of 124.5° C. and a magnification of 1.25 fold in a transverse direction, and that the heat-setting temperature was 124.5° C.

Comparative Example 8

A microporous polyethylene membrane having an average thickness of 25.0 μm was produced in the same manner as in Example 1, except that the stretching temperature was 118° C., that the re-stretching conditions were a temperature of 124.5° C. and a magnification of 1.6 fold in a transverse direction, and that the heat-setting temperature was 124.5° C.

The properties of each microporous polyethylene membrane produced in Examples 1-5 and Comparative Examples 1-8 were measured by the following methods. The results are shown in Table 1.

(1) Air Permeability (sec/100 cm$^3$)

Air permeability was measured using an Oken-type air permeability meter (EGO-1T available from Asahi Seiko K. K.). Air permeability was measured in accordance with JIS P8117 is converted to air permeability $P_2$ at a thickness of 20 μm by the equation of $P_2=(P_1\times 20)/T_1$.

(2) Porosity (%)

Measured by a conventional (mass) method.

(3) Pin Puncture Strength (mN)

The maximum load was measured, when a microporous membrane was pricked with a needle of 1 mm in diameter with a spherical end surface (radius R of curvature: 0.5 mm) at a rate of 2 mm/second.

(4) Tensile Rupture Strength and Tensile Rupture Elongation

Measured using a 10-mm-wide rectangular sample according to ASTM D882.

(5) Heat Shrinkage Ratio (%)

The shrinkage ratio of each microporous polyolefin membrane was measured three times in both longitudinal and transverse directions after maintaining a membrane temperature 105° C. for 8 hours, and averaging the measured shrinkages.

(6) Maximum Shrinkage Ratio Immediately Before Melting

A rectangular sample of 3 mm×50 mm was cut out of the microporous membrane such that the longitudinal direction of the sample was aligned with the transverse direction of the microporous membrane, and set in a thermomechanical analyzer (TMA/SS6000 available from Seiko Instruments, Inc.) at a chuck distance of 10 mm. With a load of 2 gf applied to a lower end of the sample, the temperature was elevated at a rate of 5° C./minute to measure its size change. A size change ratio was calculated relative to the size at 23° C., to obtain a temperature-size change ratio curve shown in FIG. 2. The maximum P of a shrinkage ratio in a temperature in the range of from 135° C. to 145° C. was defined as "maximum shrinkage ratio immediately before melting."

TABLE 1

| | No. | | | | |
|---|---|---|---|---|---|
| | Example 1 | Example 2 | Example 3 | Example 4 | Example 5 |
| Polyethylene Composition | | | | | |
| UHMWPE | | | | | |
| Mw | $2.5\times 10^6$ | $2.5\times 10^6$ | $2.5\times 10^6$ | $2.5\times 10^6$ | $2.5\times 10^6$ |
| % by mass | 18 | 18 | 30 | 18 | 18 |
| HDPE | | | | | |
| Mw | $2.8\times 10^5$ | $2.8\times 10^5$ | $2.8\times 10^5$ | $2.8\times 10^5$ | $2.8\times 10^5$ |
| % by mass | 82 | 82 | 70 | 82 | 82 |
| $\omega_0^{(2)}$ (rad/sec) | 0.114 | 0.114 | 0.0343 | 0.114 | 0.114 |
| Production Conditions | | | | | |
| Concentration of PE Composition (% by mass) | 25 | 25 | 23 | 25 | 25 |
| Stretching | | | | | |
| Temperature (° C.) | 118.5 | 119.5 | 118.5 | 119.7 | 118 |
| Magnification (MD$^{(3)}$ × TD$^{(4)}$) | 5 × 5 | 5 × 5 | 5 × 5 | 5 × 5 | 5 × 5 |
| Re-stretching | | | | | |
| Temperature (° C.) | 123 | 122.5 | 123 | 126.3 | 124.5 |
| Direction | TD | TD | TD | TD | TD |
| Magnification | 1.4 | 1.6 | 1.6 | 1.45 | 1.45 |
| Heat-setting | | | | | |
| Temperature (° C.) | 123 | — | — | 126.3 | 124.5 |
| Time (minute) | 10 | — | — | 10 | 10 |
| Annealing | | | | | |
| Temperature (° C.) | — | 122.5 | 123 | — | — |
| Shrinkage Direction | — | TD | TD | — | — |
| $L_2^{(5)}$ | — | $1.4L_1^{(6)}$ | $1.4L_1^{(6)}$ | — | — |

TABLE 1-continued

| Properties of Microporous Membrane | | | | | |
|---|---|---|---|---|---|
| Average Thickness (μm) | 25.0 | 24.7 | 25.6 | 25.0 | 25.0 |
| Air Permeability (sec/100 cm$^3$) | 83 | 89 | 89 | 98 | 91 |
| Porosity (%) | 58.5 | 57.6 | 57.8 | 52.5 | 56.2 |
| Pin Puncture Strength (mN) | 2,781 | 3,036 | 3,224 | 2,911 | 3,018 |
| Tensile Rupture Strength (kPa) | | | | | |
| MD | 52,293 | 58,055 | 56,801 | 49,980 | 52,430 |
| TD | 59,172 | 66,856 | 73,049 | 75,558 | 77,910 |
| Heat Shrinkage Ratio (%) | | | | | |
| MD | 9.8 | 9.6 | 9.8 | 4.1 | 6.8 |
| TD | 10.4 | 6.4 | 6.3 | 6.5 | 11.8 |
| Maximum Shrinkage Ratio$^{(7)}$ (%) | | | | | |
| MD | 13 | 15 | 13 | 17 | 18 |
| TD | 18 | 16 | 19 | 18 | 18 |

| | No. | | | |
|---|---|---|---|---|
| | Com. Ex. 1 | Com. Ex. 2 | Com. Ex. 3 | Com. Ex. 4 |
| UHMWPE | | | | |
| Mw | $2.5 \times 10^6$ | $2.5 \times 10^6$ | $2.5 \times 10^6$ | $2.5 \times 10^6$ |
| % by mass | 18 | 18 | 18 | 18 |
| HDPE | | | | |
| Mw | $2.5 \times 10^5$ | $2.5 \times 10^5$ | $2.8 \times 10^5$ | $2.8 \times 10^5$ |
| % by mass | 82 | 82 | 82 | 82 |
| $\omega_0^{(2)}$ (rad/sec) | 0.0038 | 0.0038 | 0.114 | 0.114 |
| Production Conditions | | | | |
| Concentration of PE Composition (% by mass) | 25 | 25 | 25 | 25 |
| Stretching | | | | |
| Temperature (° C.) | 119.7 | 119.7 | 118 | 115.5 |
| Magnification (MD$^{(3)}$ × TD$^{(4)}$) | 5 × 5 | 5 × 5 | 5 × 5 | 5 × 5 |
| Re-stretching | | | | |
| Temperature (° C.) | 110 | 125.0 | 127.5 | 128.0 |
| Direction | TD | TD | TD | TD |
| Magnification | 1.4 | 1.4 | 1.4 | 1.4 |
| Heat-setting | | | | |
| Temperature (° C.) | 110 | 125 | 127.5 | 128 |
| Time (minute) | 10 | 10 | 10 | 10 |
| Annealing | | | | |
| Temperature (° C.) | — | — | — | — |
| Shrinkage Direction | — | — | — | — |
| L$_2^{(5)}$ | — | — | — | — |
| Properties of Microporous Membrane | | | | |
| Average Thickness (μm) | 30.0 | 26.0 | 25.4 | 23.8 |
| Air Permeability (sec/100 cm$^3$) | 75 | 81 | 123 | 174 |
| Porosity (%) | 63.0 | 54.8 | 51.4 | 47.1 |
| Pin Puncture Strength (mN) | 1,960 | 2,009 | 3,896 | 4,688 |
| Tensile Rupture Strength (kPa) | | | | |
| MD | 30,380 | 30,380 | 77,753 | 101,587 |
| TD | 31,360 | 31,360 | 91,846 | 111,093 |
| Heat Shrinkage Ratio (%) | | | | |
| MD | 17.0 | 6.1 | 3.3 | 2.6 |
| TD | 25.0 | 7.2 | 4.3 | 3.8 |
| Maximum Shrinkage Ratio$^{(7)}$ (%) | | | | |
| MD | 17 | 10 | 14 | 22 |
| TD | 17 | 11 | 25 | 28 |

TABLE 1-continued

| | No. | | | |
|---|---|---|---|---|
| | Com. Ex. 5 | Com. Ex. 6 | Com. Ex. 7 | Com. Ex. 8 |
| Polyethylene Composition | | | | |
| UHMWPE | | | | |
| Mw | $2.5 \times 10^6$ | $2.5 \times 10^6$ | $2.5 \times 10^6$ | $2.5 \times 10^6$ |
| % by mass | 18 | 18 | 18 | 18 |
| HDPE | | | | |
| Mw | $2.8 \times 10^5$ | $2.8 \times 10^5$ | $2.8 \times 10^5$ | $2.8 \times 10^5$ |
| % by mass | 82 | 82 | 82 | 82 |
| $\omega_0^{(2)}$ (rad/sec) | 0.114 | 0.114 | 0.114 | 0.114 |
| Production Conditions | | | | |
| Concentration of PE Composition (% by mass) | 25 | 25 | 25 | 25 |
| Stretching | | | | |
| Temperature (° C.) | 119.2 | 117 | 118 | 118 |
| Magnification (MD$^{(3)}$ × TD$^{(4)}$) | 5 × 5 | 5 × 5 | 5 × 5 | 5 × 5 |
| Re-stretching | | | | |
| Temperature (° C.) | 128 | 124.5 | 124.5 | 124.5 |
| Direction | TD | TD | TD | TD |
| Magnification | 1.4 | 1.45 | 1.25 | 1.6 |
| Heat-setting | | | | |
| Temperature (° C.) | 128 | 124.5 | 124.5 | 124.5 |
| Time (minute) | 10 | 10 | 10 | 10 |
| Annealing | | | | |
| Temperature (° C.) | — | — | — | — |
| Shrinkage Direction | — | — | — | — |
| $L_2^{(5)}$ | — | — | — | — |
| Properties of Microporous Membrane | | | | |
| Average Thickness (μm) | 24.1 | 25.0 | 25.0 | 25.0 |
| Air Permeability (sec/100 cm³) | 118 | 103 | 117 | 76 |
| Porosity (%) | 47.7 | 55.6 | 52.8 | 58.7 |
| Pin Puncture Strength (mN) | 3,222 | 3,440 | 2,920 | 3,097 |
| Tensile Rupture Strength (kPa) | | | | |
| MD | 67,600 | 61,250 | 60,466 | 46,452 |
| TD | 72,050 | 87,318 | 63,602 | 88,592 |
| Heat Shrinkage Ratio (%) | | | | |
| MD | 2.5 | 6.6 | 6.3 | 7.2 |
| TD | 3.4 | 13.3 | 8.3 | 15.3 |
| Maximum Shrinkage Ratio$^{(7)}$ (%) | | | | |
| MD | 5 | 20 | 19 | 17 |
| TD | 10 | 18 | 18 | 18 |

Note:
[1] Mw represents a weight-average molecular weight.
[2] Angular frequency, at which the storage elastic modulus G' and the loss elastic modulus G" measured at 180° C. by melt rheometry were equal.
[3] MD represents a longitudinal direction.
[4] TD represents a transverse direction.
[5] $L_2$ represents the length of the annealed microporous membrane.
[6] $L_1$ represents the length of the microporous membrane before re-stretching.
[7] Maximum shrinkage ratio immediately before melting.

As is clear from Table 1, each microporous membrane of Examples 1-5 was obtained from the PE composition having $\omega_0$ of 0.01 rad/sec or more by the steps of stretching at a temperature of 118° C. or higher, and (a) re-stretching in a range from 1.3 to 1.5 fold at 127° C. or lower, and then heat-setting at 127° C. or lower, or (b) re-stretching at 127° C. or lower and then annealing at 127° C. or lower, under the condition that the formula (I) of $1.3L_1 \leqq L_2 \leqq 1.5L_1$, wherein $L_1$ represents the length (in a stretching direction) of the microporous membrane before re-stretching, and $L_2$ represents the length (in a stretching direction) of the microporous membrane after annealing. It is believed that because these conditions were met, the membranes had an air permeability in the range of from 20 sec/100 cm³ to 100 sec/100 cm³, a pin puncture strength of 2,450 mN or more, and a heat shrinkage ratio of 12% or less at 105° C., despite the average thickness of 23 μm or more.

On the other hand, the microporous membranes of Comparative Examples 1 and 2 obtained from the PE composition having $\omega_0$ less than 0.01 rad/sec were poorer than those of Examples 1-5 in pin puncture strength. The microporous membrane of Comparative Example 3 obtained at a re-stretching temperature and a heat-setting temperature both higher than 127° C. was poorer than those of Examples 1-5 in permeability. The microporous membrane of Comparative Example 4 obtained at a stretching temperature of lower than 118° C. and at a re-stretching temperature and a heat-setting temperature both higher than 127° C. was lower in porosity and poorer in permeability and melt shrinkage resistance than those of Examples 1-5. The microporous membrane of Comparative Example 5 obtained at a re-stretching temperature and a heat-setting temperature both higher than 127° C. was lower in porosity and poorer in permeability than those of Examples 1-5. The microporous membrane of Comparative Example 6 obtained at a stretching temperature of lower than 118° C. was poorer than those of Examples 1-5 in heat shrinkage resistance. The microporous membrane of Comparative Example 7 obtained at a re-stretching magnification of less than 1.3 fold was poorer than those of Examples 1-5 in permeability. Though the microporous membrane of Comparative Example 8 was re-stretched to more than 1.5 fold, it was poorer than those of Examples 1-5 in heat shrinkage resistance. It is believed that this is the case because it was not subjected to annealing under the condition meeting the formula (I).

Finally, embodiments of this invention are as follows:

[1] A method for making a microporous polyolefin membrane, comprising:
  (1) combining a membrane-forming solvent and a polyethylene resin having a viscoelastic angular frequency $\omega_0$ greater than or equal to 0.01 rad/sec, at which a storage elastic modulus G' and a loss elastic modulus G" obtained by melt rheometry are equal to each other, to form a polyolefin solution,
  (2) extruding the polyolefin solution to form an extrudate, and cooling the extrudate to a temperature at or below the extrudate's gelation temperature to form a cooled extrudate,
  (3) stretching the cooled extrudate at a temperature of about 118° C. or higher to form a stretched sheet,
  (4) removing at least a portion of the membrane-forming solvent from the stretched sheet to form a solvent-removed sheet, and
  (5) either
    (a) further stretching the solvent-removed sheet in at least one lateral direction of the sheet at a membrane temperature of about 127° C. or lower from an initial length in the stretching direction $L_1$ to a final length in the stretching direction $L_2$ such that $1.3L_1 \leq L_2 \leq 1.5L_1$, and then heat-setting the re-stretched sheet at 127° C. or lower, or
    (b) further stretching the solvent-removed sheet in at least one lateral direction of the sheet at a membrane temperature of about 127° C. or lower from an initial length in the stretching direction $L_1$ to a second length in the stretching direction $L_2$ such that $1.31L_1 \leq L_2 \leq 2L_1$, and then annealing under conditions such that $1.3L_1 \leq L_3 \leq 1.5L_1$, wherein $L_3$ represents the length in the stretching direction of the re-stretched sheet after annealing.

[2] The method of [1], further comprising between steps (4) and (5) removing at least a portion of any volatile species in the solvent-removed sheet.

[3] The method of [1] or [2], further comprising at least one of the following steps in any order
  (6) annealing the polyolefin membrane;
  (7) cross-linking the polyolefin membrane;
  (8) subjecting the polyolefin membrane to a hydrophilizing treatment; or
  (9) coating the polyolefin membrane with a porous material.

[4] The method of [1] through [3] wherein the membrane-forming solvent is one or more of aliphatic, alicyclic or aromatic hydrocarbons, mineral oil distillates, and phthalates.

[5] The method of [1]-[4] wherein the first solvent is liquid paraffin having a viscosity of about 30 cSt to about 500 cSt at a temperature of 25° C.

[6] The method of [1]-[5] wherein:
  (a) the combining of the polyethylene resin with the membrane-forming solvent is conducted by melt-blending in a double-screw extruder at a temperature in a range of about the melting point of the polyethylene resin to about 80° C. above the melting point of the polyethylene resin;
  (b) the amount of the polyolefin in the polyolefin solution ranges from about 1% to about 75% by mass, based on the mass of the polyolefin solution;
  (c) the polyolefin solution is conducted to at least one die, wherein the die is a sheet-forming die having a rectangular cross-section orifice, the die has a die gap in a range of about 0.1 mm to about 5 mm, the polyolefin solution is at a temperature of about 140° C. to about 250° C. during extrusion, and wherein the extrusion speed of the polyolefin solution ranges from about 0.2 m/minute to about 15 m/minute;
  (d) the cooling of step (2) is conducted at a cooling rate of at least 50° C./minute;
  (e) the stretching of step (3) is conducted in first and second lateral directions of the cooled extrudate to a stretching magnification factor in a range of about 9 to about 400 in at least one of the lateral directions.
  (f) the membrane-forming solvent is removed from the stretched sheet by a washing solvent comprising one or more of volatile solvents, chlorinated hydrocarbons, ethers, ketones, linear fluorocarbons, cyclic hydrofluorocarbons, perfluoroethers, and mixtures thereof.

[7] The method of [1]-[6], wherein the polyethylene resin comprises a (i) polyethylene having an Mw of at least about $1 \times 10^6$, (ii) polyethylene having an Mw less than $1 \times 10^6$, or both (i) and (ii).

[8] The method of [1]-[7], wherein the polyolefin solution further comprises the other polyolefin than the polyethylene resin selected from at least one of polypropylene, polybutene-1, polypentene-1, poly-4-methylpentene-1, polyhexene-1, polyoctene-1, polyvinyl acetate, polymethyl methacrylate, polystyrene and ethylene α-olefin copolymer.

[9] The method of [1] through [8] wherein the polyethylene resin comprises ultra-high molecular weight polyethylene and high density polyethylene, and wherein the polyolefin solution further comprises polypropylene having an Mw in the range of about $1 \times 10^4$ to about $4 \times 10^6$.

[10] The microporous polyolefin membrane made by the process of any of [1]-[9].

[11] A microporous polyolefin membrane characterized by
  (a) an air permeability in a range of 20 to 100 sec/100 cm$^3$,
  (b) a pin puncture strength of 2,450 mN or more, and
  (c) a heat shrinkage ratio of 12% or less at 105° C.

[12] The membrane of [11] having a thickness of at least about 23 μm.

[13] The membrane of [12] wherein the membrane comprises polyethylene having a viscoelastic angular frequency $\omega_0$ of at least 0.01 rad/sec, at which a storage elastic modulus G' and a loss elastic modulus G" obtained by melt rheometry are equal to each other.

[14] The membrane of [11]-[13] wherein the polyethylene comprises (i) polyethylene having an Mw of at least about $1 \times 10^6$, (ii) polyethylene having an Mw less than $1 \times 10^6$, or both (i) and (ii).

[15] The membrane of [14] wherein the polyethylene having an Mw of at least about $1 \times 10^6$ is an ethylene homopolymer.

[16] The membrane of [14] wherein the polyethylene having an Mw of less than $1 \times 10^6$ is at least one of high-density polyethylene, medium-density polyethylene, branched low-density polyethylene and linear low-density polyethylene.

[17] The membrane of [16] wherein the polyethylene having an Mw of less than $1 \times 10^6$ is a high-density polyethylene having an Mw in a range of about $1 \times 10^5$ to about $5 \times 10^5$.

[18] The membrane of [14] further comprising a second polyolefin selected from at least one of polypropylene, polybutene-1, polypentene-1, poly-4-methylpentene-1, polyhexene-1, polyoctene-1, polyvinyl acetate, polymethyl methacrylate, polystyrene and ethylene α-olefin copolymer.

[19] The membrane of [18] wherein the polyethylene is ultra-high-molecular-weight polyethylene and high density polyethylene, and the second polyolefin is polypropylene.

[20] A battery separator comprising the membrane of any of [10] through [19].

[21] A battery comprising an electrolyte, an anode, a cathode, and a separator situated between the anode and the cathode, wherein the separator comprises polyethylene, the polyethylene having a viscoelastic angular frequency $\omega_0$ of at least 0.01 rad/sec, at which a storage elastic modulus G' and a loss elastic modulus G" obtained by melt rheometry are equal to each other, the separator being characterized by
  (a) a heat shrinkage ratio of 12% or less at 105° C.,
  (b) an air permeability (as measured prior to incorporation of the separator into the battery) in a range of about 20 to 100 sec/100 cm$^3$,
  (c) a pin puncture strength of 2,450 mN or more, and
  (d) a thickness a thickness of at least about 23 μm.

[22] The battery of [21] wherein the battery is a lithium ion secondary battery, a lithium-polymer secondary battery, a nickel-hydrogen secondary battery, a nickel-cadmium secondary battery, a nickel-zinc secondary battery, or a silver-zinc secondary battery.

[23] The battery of [21] or [22] wherein the cathode comprises a current collector, and a cathodic active material layer on the current collector capable of absorbing and discharging lithium ions.

[24] The battery of [21] through [23] wherein the electrolyte comprises lithium salts in an organic solvent.

[25] A method for making a battery, comprising:
  (1) combining a membrane-forming solvent and a polyethylene resin having a viscoelastic angular frequency $\omega_0$ greater than or equal to 0.01 rad/sec, at which a storage elastic modulus G' and a loss elastic modulus G" obtained by melt rheometry are equal to each other, to form a polyolefin solution,
  (2) extruding the polyolefin solution to form an extrudate, and cooling the extrudate to a temperature at or below the extrudate's gelation temperature to form a cooled extrudate,
  (3) stretching the cooled extrudate at a temperature of about 118° C. or higher to form a stretched sheet,
  (4) removing at least a portion of the membrane-forming solvent from the stretched sheet to form a solvent-removed sheet, and
  (5) either
    (a) further stretching the solvent-removed sheet in at least one lateral direction of the sheet at a membrane temperature of about 127° C. or lower from an initial length in the stretching direction $L_1$ to a final length in the stretching direction $L_2$ such that $1.3L_1 \leq L_2 \leq 1.5L_1$, and then heat-setting the re-stretched sheet at 127° C. or lower to form a separator, or
    (b) further stretching the solvent-removed sheet in at least one lateral direction of the sheet at a membrane temperature of about 127° C. or lower from an initial length in the stretching direction $L_1$ to a second length in the stretching direction $L_2$ such that $1.31L_1 \leq L_2 \leq 2L_1$, and then annealing under conditions such that $1.3L_1 \leq L_3 \leq 1.5L_1$, wherein $L_3$ represents the length in the stretching direction of the re-stretched sheet after annealing to form a separator;
  (6) locating an anode in proximity to a first surface of the separator, locating a cathode in proximity to a second surface of the separator and impregnating the separator with an electrolyte containing lithium ions.

[26] The method of [25] wherein the battery is a secondary battery.

[27] The method of [25] or [26] wherein the separator is characterized by
  (a) a heat shrinkage ratio of 12% or less at 105° C.,
  (b) an air permeability (as measured prior to step (6)) in a range of about from 20 to 100 sec/100 cm$^3$,
  (c) a pin puncture strength of 2,450 mN or more, and
  (d) a thickness of at least about 23 μm.

[28] The method of [25]-[27], further comprising using the battery as a source or sink of electric charge.

EFFECT OF THE INVENTION

The microporous polyolefin membrane of the present invention can be a relatively thick membrane and has relatively well-balanced permeability, pin puncture strength and heat shrinkage resistance. HEV batteries such as hybrid car batteries comprising the microporous polyolefin membranes of the present invention as separators generally have suitable capacity, cyclability, and dischargeability. The batteries have suitable heat resistance, compression resistance, etc., and productivity.

The invention claimed is:

1. A method for making a microporous polyolefin membrane, comprising:
  (1) combining a membrane-forming solvent and a polyethylene resin having a viscoelastic angular frequency $\omega_0$ greater than or equal to 0.01 rad/sec, to form a polyolefin solution,
  (2) extruding the polyolefin solution to form an extrudate, and cooling the extrudate to a temperature at or below the extrudate's gelation temperature to form a cooled extrudate,
  (3) stretching the cooled extrudate at a temperature of 118° C. or higher to form a stretched sheet,
  (4) removing at least a portion of the membrane-forming solvent from the stretched sheet to form a solvent-removed sheet, and
  (5) either
    (a) further stretching the solvent-removed sheet in at least one lateral direction of the sheet at a membrane temperature of 127° C. or lower from an initial length in the stretching direction $L_1$ to a final length in the stretching direction $L_2$ such that $1.3L_1 < L_2 < 1.5L_1$ and then heat-setting the re-stretched sheet at 127° C. or lower, or
    (b) further stretching the solvent-removed sheet in at least one lateral direction of the sheet at a membrane temperature of 127° C. or lower from an initial length in the stretching direction $L_1$ to a second length in the stretching direction $L_2$ such that $1.31L_1 < L_2 < 2L_1$, and then annealing under conditions such that $1.3L_1 \leq L_3 \leq 1.5L_1$, wherein $L_3$ represents the length in the stretching direction of the re-stretched sheet after annealing.

2. The method of claim 1 further comprising between steps (4) and (5) removing at least a portion of any volatile species in the solvent-removed sheet.

3. The method of claim 1, further comprising at least one of the following steps in any order
- (6) annealing the polyolefin membrane;
- (7) cross-linking the polyolefin membrane;
- (8) subjecting the polyolefin membrane to a hydrophilizing treatment; or
- (9) coating the polyolefin membrane with a porous material.

4. The method of claim 1 wherein the membrane-forming solvent is one or more of aliphatic, alicyclic or aromatic hydrocarbons, mineral oil distillates, and phthalates.

5. The method of claim 1 wherein the membrane-forming solvent is liquid paraffin having a viscosity of 30 cSt to 500 cSt at a temperature of 25° C.

6. The method of claim 1 wherein:
- (a) the combining of the polyethylene resin with the membrane-forming solvent is conducted by melt-blending in a double-screw extruder at a temperature in a range of the melting point of the polyethylene resin to 80° C. above the melting point of the polyethylene resin;
- (b) the amount of the polyolefin in the polyolefin solution ranges from 1% to 75% by mass, based on the mass of the polyolefin solution;
- (c) the polyolefin solution is conducted to at least one die, wherein the die is a sheet-forming die having a rectangular cross-section orifice, the die has a die gap in a range of 0.1 mm to 5 mm, the polyolefin solution is at a temperature of 140° C. to 250° C. during extrusion, and wherein the extrusion speed of the polyolefin solution ranges from 0.2 m/minute to 15 m/minute;
- (d) the cooling of step (2) is conducted at a cooling rate of at least 50° C./minute;
- (e) the stretching of step (3) is conducted in first and second lateral directions of the cooled extrudate to a stretching magnification factor in a range of 9 to 400 in at least one of the lateral directions;
- (f) the membrane-forming solvent is removed from the stretched sheet by a washing solvent comprising one or more of volatile solvents, chlorinated hydrocarbons, ethers, ketones, linear fluorocarbons, cyclic hydrofluorocarbons, perfluoroethers, and mixtures thereof.

7. The method of claim 1 wherein the polyethylene resin comprises a (i) polyethylene having an Mw of at least $1 \times 10^6$, (ii) polyethylene having an Mw less than $1 \times 10^6$, or both (i) and (ii).

8. The method of claim 1 wherein the polyolefin solution further comprises, in addition to the polyethylene resin, at least one polyolefin selected from the group consisting of polypropylene, polybutene-1, polypentene-1, poly-4-methyl-pentene-1, polyhexene-1, polyoctene-1, polyvinyl acetate, polymethyl methacrylate, polystyrene and ethylene α-olefin copolymer.

9. The method of claim 1 wherein the polyethylene resin comprises ultra-high molecular weight polyethylene and high density polyethylene, and wherein the polyolefin solution further comprises polypropylene having an Mw in the range of $1 \times 10^4$ to $4 \times 10^6$.

10. The microporous polyolefin membrane made by the process of claim 1.

11. A battery separator comprising the membrane of claim 10.

12. A method for making a battery, comprising:
- (1) combining a membrane-forming solvent and a polyethylene resin having a viscoelastic angular frequency $\omega_0$ greater than or equal to 0.1 rad/sec, to form a polyolefin solution,
- (2) extruding the polyolefin solution to form an extrudate, and cooling the extrudate to a temperature at or below the extrudate's gelation temperature to form a cooled extrudate,
- (3) stretching the cooled extrudate at a temperature of 118° C. or higher to form a stretched sheet,
- (4) removing at least a portion of the membrane-forming solvent from the stretched sheet to form a solvent-removed sheet, and
- (5) either
  - (a) further stretching the solvent-removed sheet in at least one lateral direction of the sheet at a membrane temperature of 127° C. or lower from an initial length in the stretching direction $L_1$ to a final length in the stretching direction L2 such that $1.31L_1 \leq L_2 \leq 1.5L_1$, and then heat-setting the re-stretched sheet at 127° C. or lower to form a separator, or
  - (b) further stretching the solvent-removed sheet in at least one lateral direction of the sheet at a membrane temperature of 127° C. or lower from an initial length in the stretching direction $L_i$ to a second length in the stretching direction L2 such that $1.3L_1 \leq L_2 \leq 2L_1$, and then annealing under conditions such that $1.3L_1 \leq L_3 \leq 1.5L_1$, wherein $L_3$ represents the length in the stretching direction of the re-stretched sheet after annealing to form a separator;
- (6) locating an anode in proximity to a first surface of the separator, locating a cathode in proximity to a second surface of the separator and impregnating the separator with an electrolyte containing lithium ions.

13. The method of claim 12 wherein the battery is a secondary battery.

14. The method of claim 12 wherein the separator is characterized by
- (a) a heat shrinkage ratio of 12% or less at 105° C.,
- (b) an air permeability (as measured prior to step (6)) in a range of from 20 to 100 sec/100 cm$^3$,
- (c) a pin puncture strength of 2,450 mN or more, and
- (d) a thickness of at least 23 gm.

15. The method of claim 12, further comprising using the battery as a source or sink of electric charge.

* * * * *